United States Patent [19]
Ohshima

[11] Patent Number: 5,947,819
[45] Date of Patent: Sep. 7, 1999

[54] OBJECT-THROWING VIDEO GAME SYSTEM

[75] Inventor: Naoto Ohshima, Tokyo, Japan

[73] Assignee: Konami Co., Ltd., Hyogo-ken, Japan

[21] Appl. No.: 08/851,057

[22] Filed: May 5, 1997

[30] Foreign Application Priority Data

May 22, 1996 [JP] Japan .................................. 8-149714

[51] Int. Cl.⁶ .................................................. A63F 7/20
[52] U.S. Cl. .................................. 463/2; 463/32; 463/36
[58] Field of Search .............................. 463/2, 3, 4, 30, 463/31, 32, 36; 434/247, 252, 307 R, 308; 473/130, 409

[56] References Cited

U.S. PATENT DOCUMENTS

| | | | |
|---|---|---|---|
| 5,554,033 | 9/1996 | Bizzi et al. | 434/307 R |
| 5,601,487 | 2/1997 | Oshima et al. | 463/4 |
| 5,704,837 | 1/1998 | Iwasaki et al. | 463/2 |
| 5,863,248 | 1/1999 | Mine et al. | 463/4 |

*Primary Examiner*—Jessica J. Harrison
*Assistant Examiner*—John Paradiso
*Attorney, Agent, or Firm*—Jordan and Hamburg LLP

[57] ABSTRACT

An object-throwing video game system displays at least an image of a throwing body and an image of an object to be visually hurled from the throwing body in a game space. The object may be a hammer, a shot, or a discus, and the throwing body may be a contestant who hurls the hammer, the shot, or the discus. The image of the throwing body is controlled to visually move in preparation for visually hurling the image of the object in the game space in response to manual operation of a controller, and the image of the object is controlled to be visually hurled from the image of the throwing body in the game space in response to manual operation of the controller. An image of an object-throwing guide is also displayed in the game space to indicate a throwing direction in which to hurl the image of the object from the image of the throwing body and which progressively varies depending on the movement of the image of the throwing body for visually hurling the image of the object. The displayed object-throwing guide which indicates the throwing direction allows the game player to easily recognize visually the exact time at which to hurl the object. The object-throwing guide is displayed in changing colors to indicate the remaining number of turns that the throwing body has to make before hurling the object.

28 Claims, 14 Drawing Sheets a1···(560, 320)
a2···(544, 324)
a3···(594, 368)
a4···(560, 394)

b1···(424, 342)
b2···(408, 346)
b3···(458, 390)
b4···(424, 416)

$(x1, y1, z1) = (8, 0, 10)$
$(x2, y2, z2) = (-8, 0, 10)$
$(x3, y3, z3) = (8, 0, -10)$
$(x4, y4, z4) = (-8, 0, -10)$

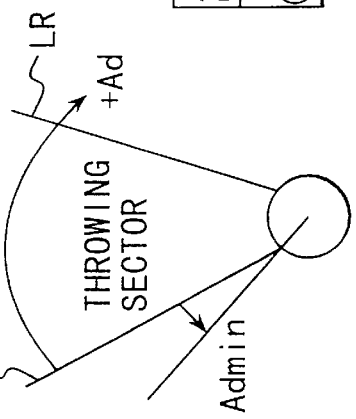

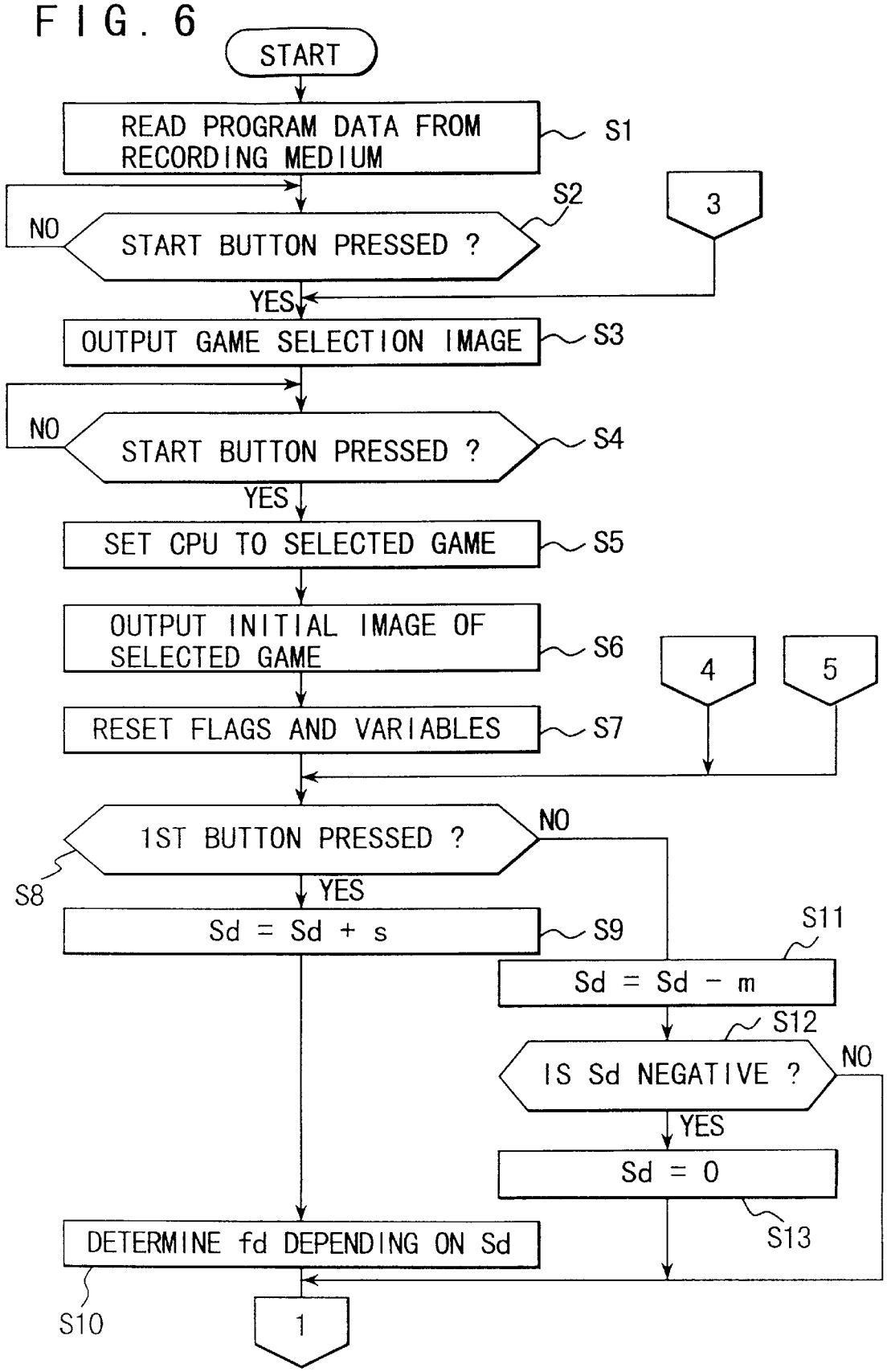

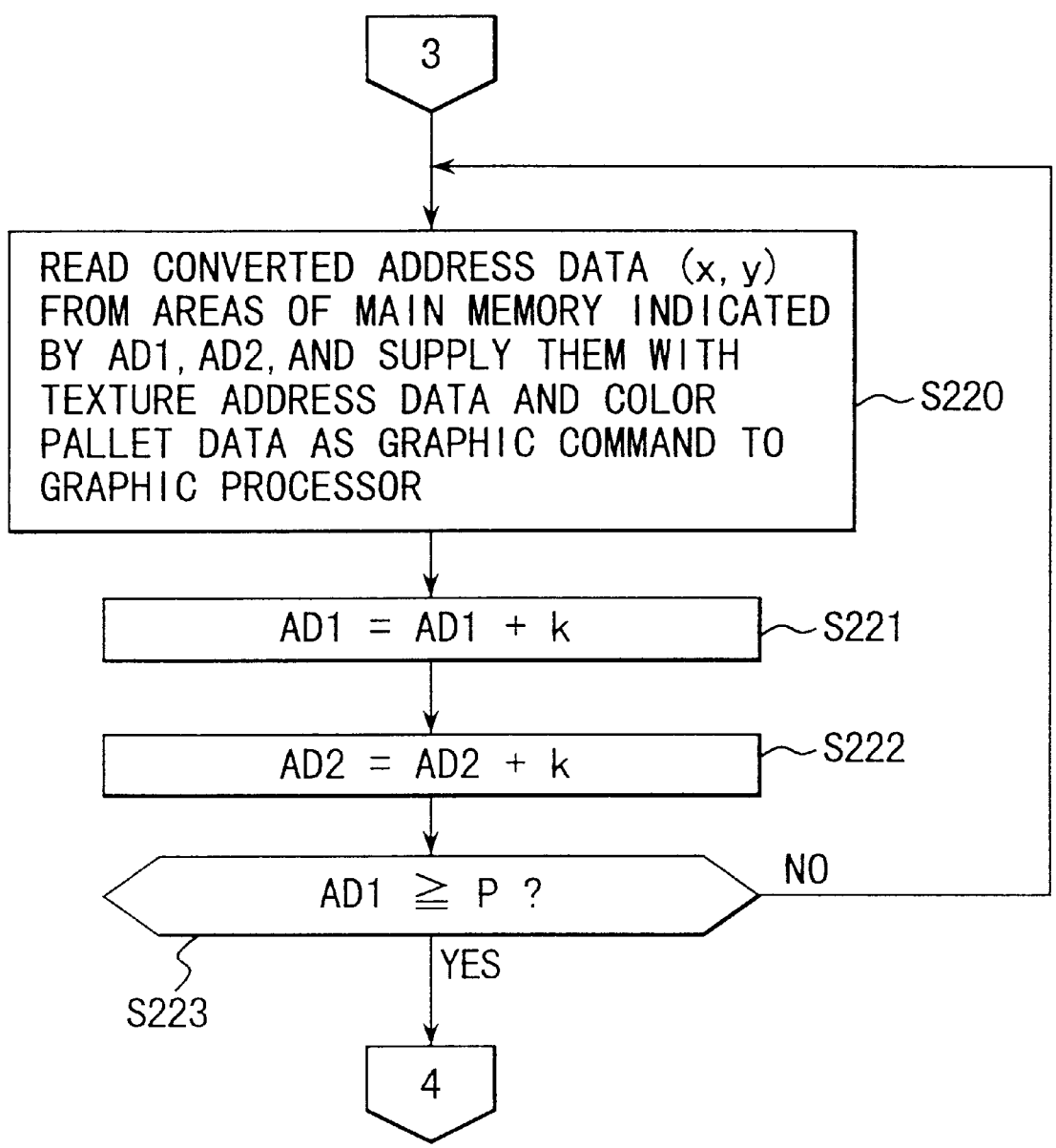

OBJECT-THROWING VIDEO GAME SYSTEM

BACKGROUND OF THE INVENTION

1. Field of the Invention

The present invention relates to an object-throwing video game system, and more particularly to an object-throwing video game system which employs a cassette-type recording medium for storing video game data, such as an optical disk, a magnetic disk, a magnetooptical disk, or a semiconductor memory, a method of displaying a guide image in an object-throwing video game which can be played on such an object-throwing video game system, and a recording medium for storing video game data of an object-throwing video game which can be played on such an object-throwing video game system.

2. Description of the Prior Art

Various video game systems which have been proposed in the art include video game systems comprising a combination of a video game machine designed for home use and a television monitor, video game systems designed as video game machines for business use, and video game systems comprising a combination of a personal computer or work station, a display unit, and an audio output unit. These video game systems commonly comprise a controller which can manually be operated by a game player, a recording medium which stores game data including game program data and graphic image data and audio data, a central processing unit (CPU) for performing a control process based on the game program data to generate graphic images and sounds from the graphic image data and audio data, a graphic processor for processing the graphic image data, an audio processor for processing the audio data, a cathode-ray tube (CRT) for displaying graphic images, and a speaker for outputting sounds. The recording medium may typically be a CD-ROM, a semiconductor memory, a cassette with a built-in semiconductor memory, or the like.

Video games are available in an increasing number of different types and become more and more complex and diverse in nature. One type of video sports games which has been proposed recently allows the game player to move a contestant displayed on the display screen of a television monitor with a controller to play a virtual sports match in a game space displayed on the display screen.

Sports contests include group competition contests such as soccer games and baseball games and individual competition contests. The individual competition contests are roughly classified into running contests, swimming contests, contests in which contestants fly, contests in which contestants lift objects, contests in which contestants fight with each other, contests in which contestants hit targets with objects, and object-throwing contests in which contestants throw objects. The object-throwing contests include shot put, hammer throw, discus throw, javelin throw, etc. If any of these object-throwing contests is realized as a video game, then it will most likely be played by the game player as follows: When the game player operates a controller of the video game system, the control unit of the video game system visually moves a contestant displayed in a game space on the display screen of a display monitor based on a command entered from the controller thereby to perform in the contest.

In the shot put, the contestant throws the ball after he has turned about 180°. In the hammer throw and discus throw, the contestant hurls the hammer or discus after having turned a plurality of times in a throwing circle. In order to realize such an object-throwing contest as a video game, it is necessary at least to establish the throwing energy of the contestant with a controller operated by the game player, display the image of the contestant as he turns 180° or several times in a game space on the display screen, display the image of the contestant as he throws the object in the game space with the controller while the contestant is turning 180° or several times, and display the object as it flies in the game space based on the established throwing energy, a throwing direction, and a throwing angle, so that the contest performed in the game space will look like real contests as much as possible.

If the direction in which the object flies in the game space is determined based on only the posture of the contestant displayed in the game space, however, the game player finds it difficult to decide the exact time for the contestant in the game space to hurl the object. This is because the game player has to decide the exact time for the contestant in the game space to hurl the object based on only contestant images that are successively displayed on the display screen.

In a hammer throw video game, a predictive vector represented by the image of arms of the contestant in the game space differs from a predictive vector represented by the image of the hammer that is being turned by the contestant. When a moving image of the contestant who is throwing the hammer is generated using a motion capture process, inertia is visually expressed in the same manner as actual inertia. Therefore, the image of the hammer is displayed behind the image of the arms of the contestant which is turning with respect to the direction in which the contestant is turning. The game player thus has difficulty in deciding the time at which the contestant in the game space should release the hammer.

In each of object-throwing contests such as hammer throw and discus throw in which the object is hurled after having turned a plurality of times, there is a principal count of turns which the object should make before it is hurled. In video games of those object-throwing contests, it is necessary to declare a throw failure if the object is not hurled when the count of its turns reaches the principal count of turns. Declaring a throw failure in such a case makes the object-throwing video game interesting and fun to play. However, since the game player needs to count how many times the object should turn before it is hurled while seeing the image of the object turn in the game space, the game player tends to induce a count error and disturb their concentration on the video game as it proceeds, possibly adversely affecting the results of the video game.

SUMMARY OF THE INVENTION

It is therefore an object of the present invention to provide an object-throwing video game system which displays for the game player an easily perceptible object-throwing guide as to the direction in which an object will be hurled from a throwing body thereby to allow the game player to recognize the exact time to hurl the object from the throwing body, and the remaining number of turns which the throwing body has to make before it hurls the object.

According to the present invention, there is provided a method of displaying an object-throwing guide in an object-throwing video game, comprising the steps of displaying at least an image of a throwing body and an image of an object to be visually hurled from the throwing body in a game space on a display screen, controlling the image of the throwing body to visually move in preparation for visually hurling the image of the object in the game space in response to manual operation of a controller, controlling the image of the object to be visually hurled from the image of the throwing body in the game space in response to manual operation of the controller, and displaying an image of an object-throwing guide in the game space to indicate a throwing direction in which to hurl the image of the object from the image of the throwing body and which progressively varies depending on the movement of the image of the throwing body for visually hurling the image of the object.

According to the present invention, there is also provided a method of displaying an object-throwing guide in an object-throwing video game, comprising the steps of displaying at least a throwing body and an object to be virtually hurled by the throwing body in a game space on a display screen, controlling the displayed throwing body to move in preparation for hurling the displayed object in the game space in response to manual operation of a controller, controlling the displayed object to be hurled from the displayed throwing body in the game space in response to manual operation of the controller, and displaying an object-throwing guide in the game space to indicate a throwing direction in which the displayed object is to be hurled from the displayed throwing body and which progressively varies depending on the movement of the displayed throwing body for hurling the displayed object.

According to the present invention, there is further provided an object-throwing video game system comprising display means for displaying at least an image of a throwing body and an image of an object to be visually hurled from the throwing body in a game space, and control mans for controlling the image of the throwing body to visually move in preparation for visually hurling the image of the object in the game space in response to manual operation of a controller, and controlling the image of the object to be visually hurled from the image of the throwing body in the game space in response to manual operation of the controller, the control means comprising means for displaying an image of an object-throwing guide in the game space to indicate a throwing direction in which to hurl the image of the object from the image of the throwing body and which progressively varies depending on the movement of the image of the throwing body for visually hurling the image of the object.

According to the present invention, there is still further provided a recording medium storing object-throwing game data including a game program comprising the steps of displaying at least an image of a throwing body and an image of an object to be visually hurled from the throwing body in a game space on a display screen, controlling the image of the throwing body to visually move in preparation for visually hurling the image of the object in the game space in response to manual operation of a controller, controlling the image of the object to be visually hurled from the image of the throwing body in the game space in response to manual operation of the controller, and displaying an image of an object-throwing guide in the game space to indicate a throwing direction in which to hurl the image of the object from the image of the throwing body and which progressively varies depending on the movement of the image of the throwing body for visually hurling the image of the object.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 4A is a diagram showing a table of frame number data and throwing orientation angle data;

FIG. 4B is a view of a throwing sector, the view also illustrating a minimum throwing orientation angle;

FIG. 4C is a diagram illustrative of an example of the absolute coordinates of the arrow;

FIG. 4D is a diagram illustrative of an example of converted addresses of the arrow which has been converted from the absolute coordinates of the arrow shown in FIG. 4C FIG. 4E is a diagram illustrative of absolute coordinate data of vertices of polygons;

FIG. 4F is a diagram illustrative of converted polygon address data converted from the absolute coordinate data shown in FIG. 4E;

FIG. 4G is a diagram illustrative of an example of converted addresses of a tail of the arrow, of the converted addresses of the arrow shown in FIG. 4D;

FIG. 4H is a diagram illustrative of an example of trail generating addresses which are generated from the converted addresses of the tail of the arrow shown in FIG. 4G;

FIGS. 6 through 9 are flowcharts of a control sequence according to a main routine of a game program which controls the object-throwing video game system shown in FIG. 1;

FIGS. 11 through 13 are flowcharts of a control sequence according to an object-throwing guide display subroutine included in the main routine.

DETAILED DESCRIPTION OF THE PREFERRED EMBODIMENT

Figure 1:
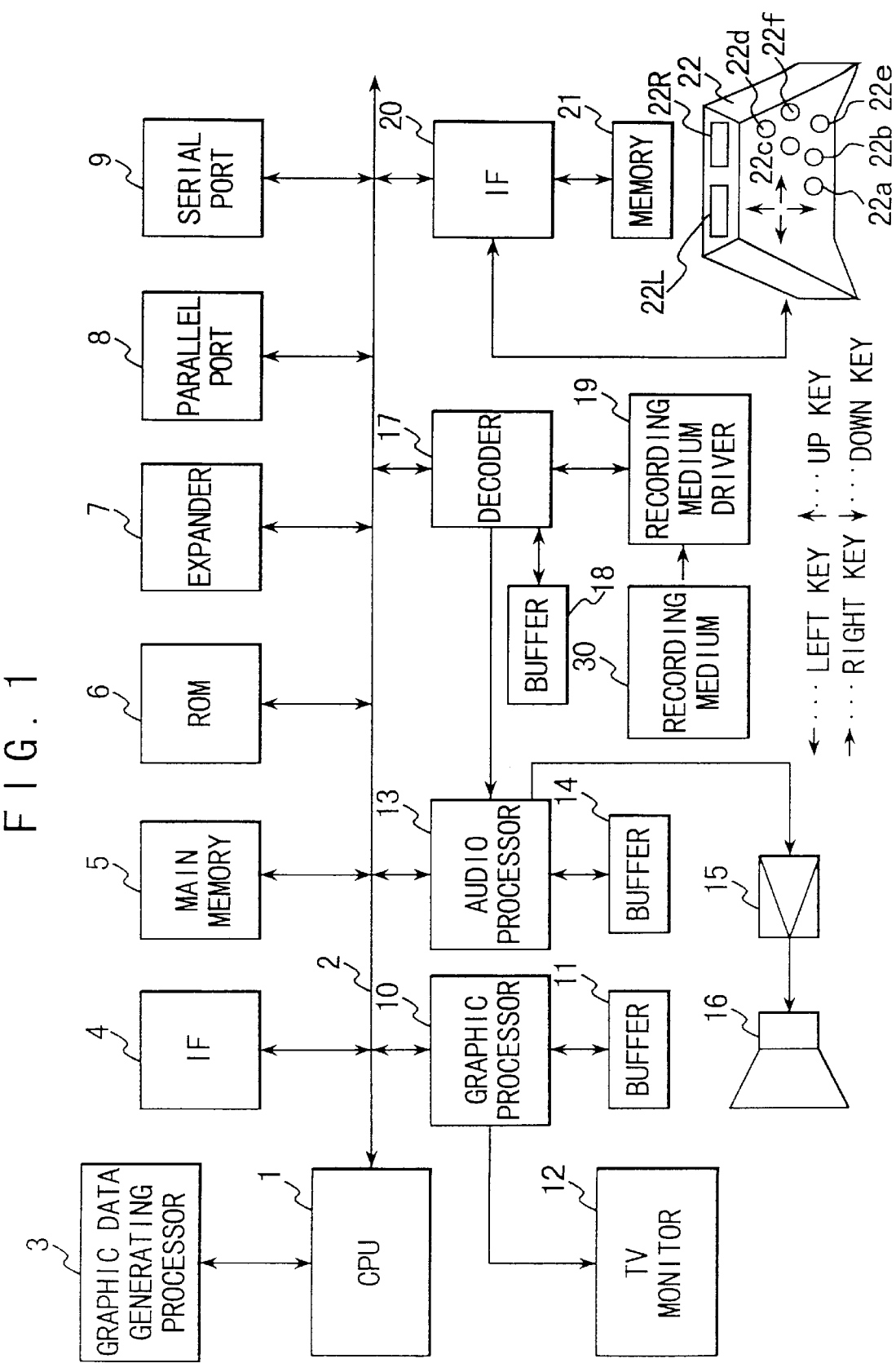
FIG. 1 is a block diagram of an object-throwing video game system according to the present invention.

A. Hardware arrangement of object-throwing video game system:

As shown in FIG. 1, an object-throwing video game system according to the present invention, which is played by a game player to play an object-throwing video game, typically a hammer-throw game, generally comprises a game machine assembly and a recording medium 30 which stores game program data, graphic image data, and audio data. The game machine assembly comprises a CPU 1, a bus 2 connected to the CPU 1 and comprising an address bus, a data bus, and a control bus, a graphic data generating processor 3 connected to the CPU 1, an interface 4 connected to the bus 2, a main memory 5 connected to the bus 2, a read-only memory (ROM) 6 connected to the bus 2, an expander 7 connected to the bus 2, a parallel port 8 connected to the bus 2, a serial port 9 connected to the bus 2, a graphic processor 10 connected to the bus 2, a buffer 11 connected to the graphic processor 10, a television monitor 12 connected to the graphic processor 10, an audio processor 13 connected to the bus 2, a buffer 14 connected to the audio processor 13, an amplifier 15 connected to the audio processor 13, a speaker 16 connected to the amplifier 15, a decoder 17 connected to the bus 2, a buffer 18 connected to the decoder 17, a recording medium driver 19 connected to the decoder 17, an interface 20 connected to the bus 2, a memory 21 connected to the interface 20, and a controller 22 connected to the interface 20. The recording medium 30 is set in the recording medium driver 19.

The object-throwing video game system may take different system configurations depending on the manner in which it is used. If the object-throwing video game system is used as a video game system for home use, for example, then the television monitor 12 and the speaker 16 are separate from the other parts of the game machine assembly. If the video game system is used as a video game system for business use, for example, then all the parts shown in FIG. 1 are assembled as a unit and encased in a single housing. If the video game system is constructed around a personal computer or a work station, then the television monitor 12 corresponds the display monitor of the computer, the graphic processor 10, the audio processor 13, and the expander 7 correspond to part of the game program data stored in the recording medium 30 or a hardware arrangement on an expansion board inserted in an expansion slot of the computer, and the interface 4, the parallel port 8, the serial port 9, and the interface 20 correspond to a hardware arrangement on an expansion board inserted in an expansion slot of the computer. The buffers 11, 14, 18 correspond to respective areas of the main memory 5 or an expansion memory (not shown). In the illustrated embodiment, the object-throwing video game system will be described as a video game system for home use.

The various parts of the video game system shown in FIG. 1 will be described below. The graphic data generating processor 3 serves as a coprocessor of the CPU 1. The graphic data generating processor 3 carries out coordinate transformations, light source calculations, and matrixes and vectors of fixed point by way of parallel processing. Main processing tasks of the graphic data generating processor 3 include a process for carrying out coordinate transformations and a process for carrying out light source calculations. In the process for carrying out coordinate transformations, the graphic data generating processor 3 determines address data in a display area of an image being processed based on absolute coordinate data, linear displacement data, and angular displacement data of each vertex in a two- or three-dimensional plane of image data supplied from the CPU 1, and returns the determined address data to the CPU 1. The process for carrying out coordinate transformations will be described in detail later on.

In the process for carrying out light source calculations, the graphic data generating processor 3 calculates the luminance of an image depending on vector data of light rays, normal data representative of directions of polygonal faces, and data representative of colors of polygonal faces.

The interface 4 serves as an interface for use with a peripheral device such as a pointing device such as a mouse, a track ball, or the like. The ROM 6 stores game program data as an operating system for the object-throwing video game system. The game program data in the ROM 6 correspond to a BIOS (Basic Input Output System) in a personal computer.

The expander 7 serves to expand graphic image data compressed by an intracoding process according to the MPEG (Moving Pictures Experts Group) standard and the JPEG (Joint Photographic Experts Group) standard. Expanding processes carried out by the expander 7 include a decoding process for decoding data encoded by a VLC (Variable Length Coding) process, an inverse quantizing process, an IDCT (Inverse Discrete Cosine Transform) process, and a decoding process of decoding intracoded images, among others.

The graphic processor 10 effects a graphic processing on data contained in the buffer 11 based on graphic commands issued from the CPU 1. The buffer 11 has a display area and a non-display area. The display area is an area for storing data to be displayed on the display screen of the television monitor 12, and the non-display area is an area for storing texture data, color palette data, etc. The texture data are two-dimensional image data. The color palette data are data for indicating colors of the texture data. These data are transferred beforehand from the recording medium 30 to the non-display area of the buffer 11 by the CPU 1 in one cycle or a plurality of cycles in synchronism with the progress of the video game.

Graphic commands issued from the CPU 1 include, for example, a graphic command for displaying a line, a graphic command for displaying a three-dimensional image using polygons, and a graphic command for displaying an ordinary two-dimensional image. Polygons are polygonal two-dimensional images which may be of a triangular or rectangular shape.

The graphic command for displaying a line comprises addresses for starting and ending displaying a line, and data representing the color of the line and the displaying of the line. The graphic command for displaying a line is issued from the CPU 1 directly to the graphic processor 10.

The graphic command for displaying a three-dimensional image using polygons comprises polygon vertex address data in the display area of the buffer 11, texture address data indicative of a storage position in the buffer 11 of texture data to be mapped onto polygons, color palette address data indicative of a storage position in the buffer 11 of color palette data representing a color of the texture data, and luminance data indicative of a luminance of the texture data. Of these data, the polygon vertex address data is calculated by the graphic data generating processor 3 based on polygon absolute coordinate data, polygon motion data, and viewpoint motion data from the CPU 1. The manner in which the polygon vertex address data is determined will be described below.

Motion of an object on the display screen of the television monitor 12 is determined by the movement of the object itself and the movement of a viewpoint with respect to the object. For example, if only the object moves and the viewpoint is fixed, then the motion of the object on the display screen of the television monitor 12 is the same as the movement of the object itself. Conversely, if the object does not move and only the viewpoint moves, then the motion of the object on the display screen of the television monitor 12 is the same as the movement of the viewpoint itself. The above explanation can be understood more easily if the term "viewpoint" is replaced with a term "camera position". Therefore, the display screen of the television monitor 12 displays the object thereon as if the object were imaged by a moving camera. While either the object or the viewpoint has been described as moving in the above explanation, the data are processed and displayed as if both the object and the viewpoint were moving.

The motion of the object comprises an angular displacement and a linear displacement. The angular displacement of the object with respect to the viewpoint is generated by rotation angles of the object and the view-point. The angular displacement and the rotation angles are expressed by 2×2 matrices in a data processing which uses a two-dimensional coordinate system and 3×3 matrices in a data processing which uses a three-dimensional coordinate system. The linear displacement of the object with respect to the viewpoint is generated by an object position (coordinates), a viewpoint position (coordinates), and a rotation angle of the viewpoint. The rotation angle is expressed by 2×2 matrices in a data processing which uses a two-dimensional coordinate system and 3×3 matrices in a data processing which uses a three-dimensional coordinate system. Rotation angles of the object and the viewpoint based on commands from the controller 22 are stored in tables. Based on a command from the controller 22, the CPU 1 reads corresponding rotation angles of the object and the viewpoint from the tables, and uses the read rotation angles to determine angular and linear displacements of the object with respect to the viewpoint.

Polygon vertex address data in the display area is determined as follows: In response to a command from the controller 22, the CPU 1 determines a rotation angle and a position of the object and a rotation angle and a position of the viewpoint. Based on the determined rotation angles of the object and the viewpoint, the CPU 1 determines an angular displacement of the object with respect to the viewpoint. Based on the position of the object and the position and rotation angle of the viewpoint, the CPU 1 determines a linear displacement of the object with respect to the viewpoint. If the angular and linear displacement data of the object are processed using a three-dimensional coordinate system, then they are expressed in 3×3 matrices.

The angular and linear displacement data of the object are supplied together with polygon absolute coordinate data to the graphic data generating processor 3. Based on the supplied angular and linear displacement data of the object, the graphic data generating processor 3 converts the polygon absolute coordinate data to polygon vertex address data. The polygon absolute coordinate data is obtained according to the above process.

The polygon vertex address data represents addresses in the display area of the buffer 11. The graphic processor 10 establishes a triangular or rectangular range in the display area of the buffer 11 which is represented by three or four polygon vertex address data, and writes texture data in the established range. Such a writing process is generally referred to as "texture mapping". The display screen of the television monitor 12 displays an object with texture data mapped onto a number of polygons which the object is constructed of.

The graphic command for displaying an ordinary two-dimensional image comprises vertex address data, texture address data, color palette address data, and luminance data indicative of a luminance of the texture data. Of these data, the vertex address data comprises coordinate data produced when vertex coordinate data in a two-dimensional space from the CPU 1 are transformed by the graphic data generating processor 3 based on linear displacement data.

The audio processor 13 stores ADPCM data read from the recording medium 30 in the buffer 14 and uses the ADPCM data stored in the buffer 14 as a sound source. The audio processor 13 reads the ADPCM data with a clock having a frequency of 44.1 kHz, for example, from the buffer 14. The audio processor 13 then processes the ADPCM data read from the buffer 14, for pitch conversion, noise addition, envelope setting, level setting, reverberation addition, etc. If audio data read from the recording medium 30 are PCM data, then the audio processor 13 converts the PCM data to ADPCM data. PCM data are processed by the video program data directly in the main memory 5. The PCM data processed in the main memory 5 are supplied to the audio processor 13, which converts the PCM data to ADPCM data, processes the ADPCM data as described above, and outputs the ADPCM data as sounds from the speaker 16.

The recording medium driver 19 may comprise a hard disk drive, an optical disk drive, a flexible disk drive, a silicon disk drive, a cassette reader, or the like, and the recording medium 30 may comprise a hard disk, an optical disk, a flexible disk, a semiconductor memory, or the like. The recording medium driver 19 reads graphic image data, audio data, and game program data from the recording medium 30, and supplies the read data to the decoder 17. The decoder 17 effects an error-correcting process on the data from the recording medium driver 19 with an ECC (Error-Correcting Code), and supplies the error-corrected data to the main memory 5 or the audio processor 13.

The memory 21 comprises a holder and a card-type memory. The card-type memory serves to hold various parameters of the game, e.g., to hold a game status when the game comes to an end. The controller 22 has arrow keys including a left key L, a right key R, an up key U, and a down key D, a left button 22L, a right button 22R, a start button 22a, a select button 22b, a first button 22c, a second button 22d, a third button 22e, and a fourth button 22f. The arrow keys are used by the game player to give the CPU 1 commands indicative of upward, downward, leftward, and rightward directions. The start button 21a is used by the game player to instruct the CPU 1 to start the game program data loaded from the recording medium 30. The select button 22b is used by the game player to instruct the CPU 1 to make various selections relative to the game program data which are loaded from the recording medium 30 to the main memory 5. The left key 22L, the right key 22R, the first–fourth buttons 22c, 22d, 22e, 22f have functions which differ depending on the game program data which are loaded from the recording medium 30.

Operation of the object-throwing video game system will briefly be described below. When a power supply switch (not shown) of the object-throwing video game system is turned on, the object-throwing video game system is energized. If the recording medium 30 is inserted in the recording medium driver 19, then the CPU 1 instructs the recording medium driver 19 to read the game data from the recording medium 30 based on the operating system stored in the ROM 6. The recording medium driver 19 then reads the graphic image data, audio data, and game program data from the recording medium 30. The graphic image data, audio data, and game program data that are read are supplied to the decoder 17, which effects an error-correcting process on the supplied data. The error-corrected data are supplied through the bus 2 to the expander 7, which expands the data. The expanded data are then supplied to the graphic processor 10, and written in the non-display area of the buffer 11 by the graphic processor 10.

The audio data that have been error-corrected by the decoder 17 are supplied to the main memory 5 or the audio processor 13, and stored in the main memory 5 or the buffer 14. The game program data that have been error-corrected by the decoder 17 are supplied to and stored in the main memory 5. Subsequently, the CPU 1 executes the video game based on the game program data stored in the main memory 5 and commands entered into the controller 22 by the game player. Specifically, the CPU 1 controls image processing, audio processing, and internal processing operations based on commands entered into the controller 22 by the game player. In the image processing operation, angular and linear displacement data and absolute coordinate data are supplied to the graphic data generating processor 3, and graphic commands including address data in the display area of the buffer 11, determined by the graphic data generating processor 3, and luminance data are issued. In the audio processing operation, an audio output command is issued to the audio processor 13 and level, reverberation, and other settings are indicated. In the internal processing operation, calculations are carried out based on commands entered into the controller 22 by the game player.

Figure 2:
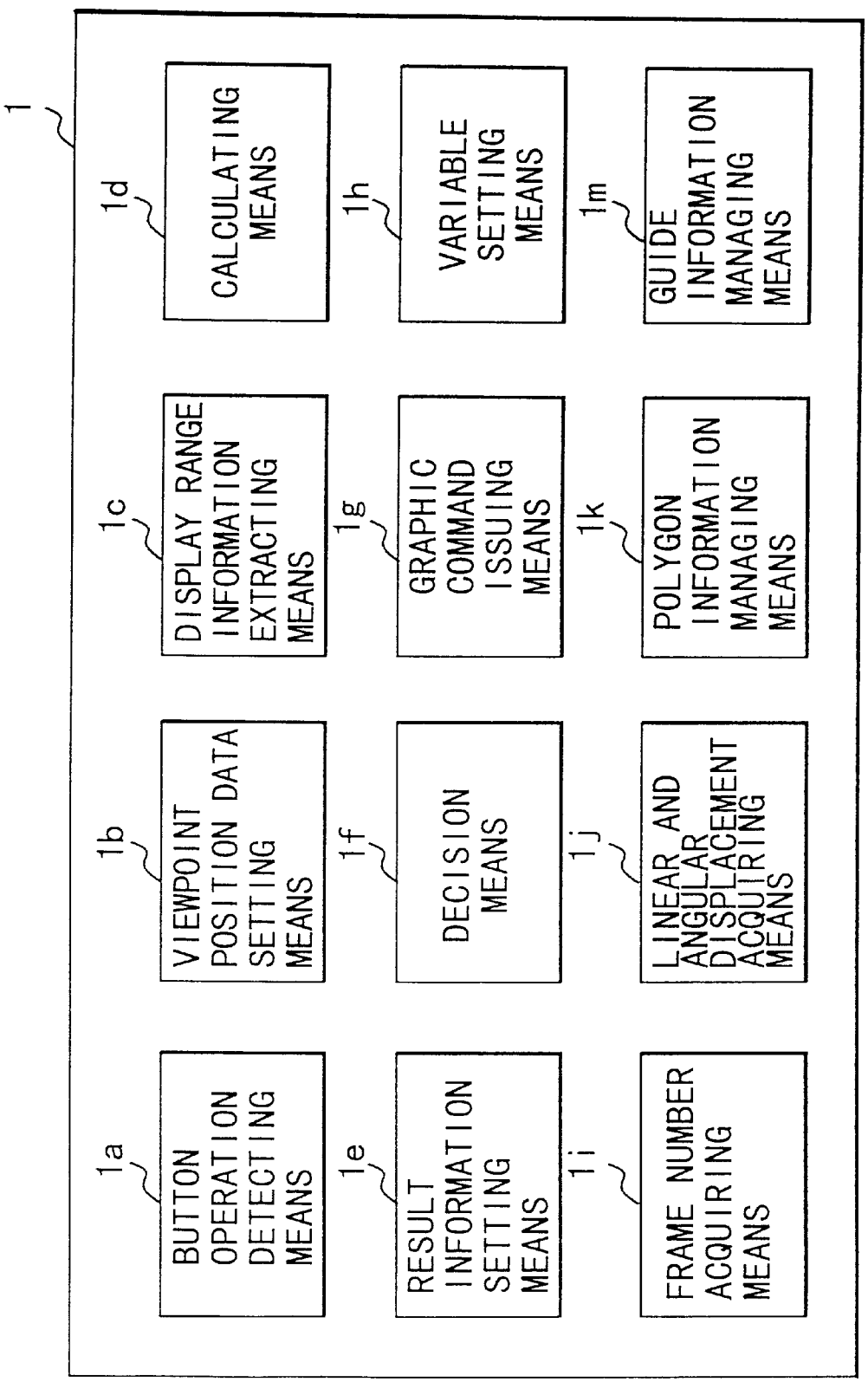
FIG. 2 is a block diagram showing functions performed by a CPU in the object-throwing video game system shown in FIG. 1.

B. Functions of the CPU 1 shown in FIG. 1:

FIG. 2 shows functions or means performed by the CPU 1 shown in FIG. 1. The CPU 1 performs the functions or means shown in FIG. 2 when it reads the game program data which have been read from the recording medium 30 and stored in the main memory 5. As shown in FIG. 2, the functions or means performed by the CPU 1 include a button operation detecting function or means 1a, a viewpoint data setting function or means 1b, a display range information extracting function or means 1c, a calculating function or means 1d, a result information setting function or means 1e, a decision function or means 1f, a graphic command issuing function or means 1g, a variable setting function or means 1h, a frame number acquiring function or means 1i, a linear and angular displacement acquiring function or means 1j, a polygon information managing function or means 1k, and a guide information managing function or means 1m. These functions or means will serve as control functions or means in subsequent processes under "E"~"G".

Figure 3A:
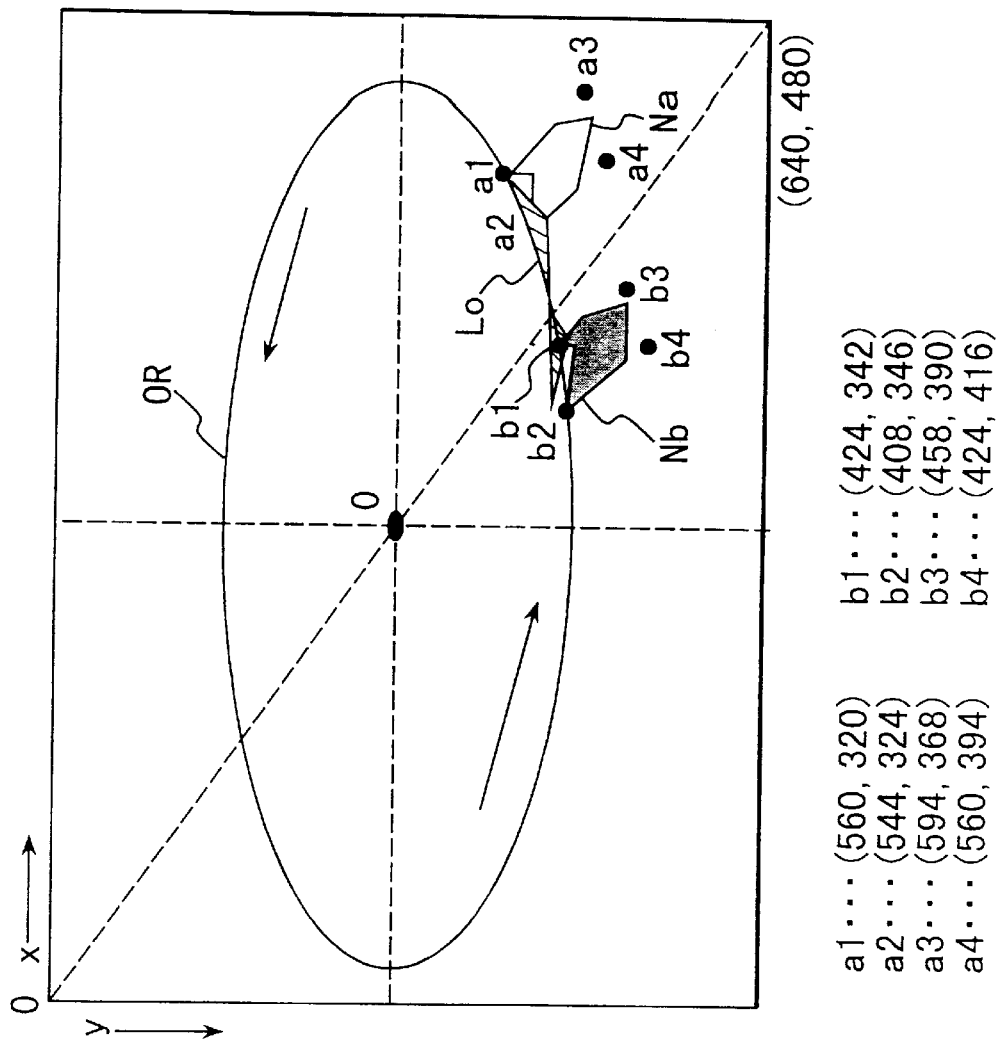
FIG. 3A is a diagram illustrative of an example of an object-throwing guide comprising an arrow and a trail on a display image.
Figure 3B:
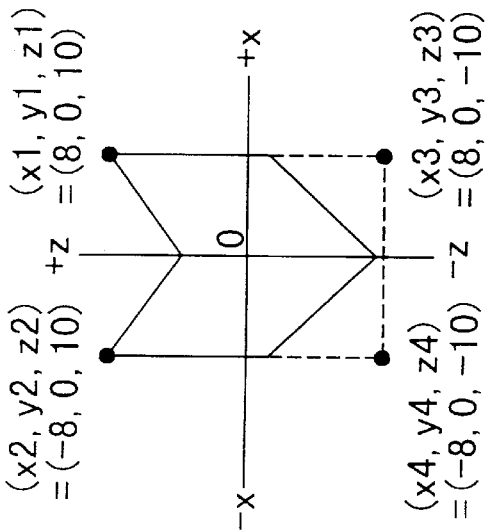
FIG. 3B is a diagram illustrative of an example of the absolute coordinates of an image of the arrow.
Figure 3C:
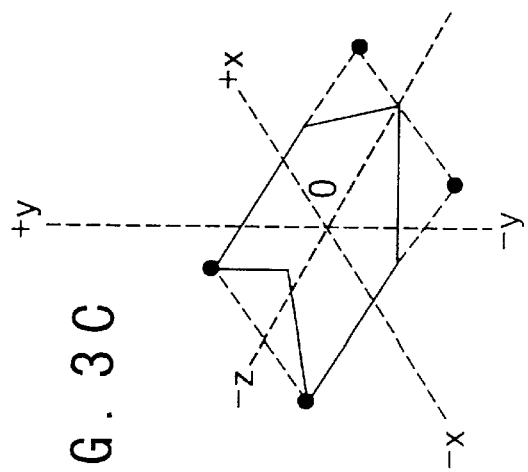
FIG. 3C is a diagram illustrative of the concept of an image deforming process for establishing the arrow in a three-dimensional coordinate system based on the absolute coordinates of the image of the arrow.

C. Display of an arrow and a trail:

FIG. 3A illustrates an object-throwing guide comprising an arrow and a trail on a display image which comprises a matrix of vertical 480 pixels×horizontal 640 pixels. FIG. 3B illustrates the absolute coordinates of an image of the arrow. FIG. 3C illustrates the concept of an image conversion process for establishing the arrow in a three-dimensional coordinate system based on the absolute coordinates of the arrow and linear and angular displacement data. FIG. 4C illustrates an example of the absolute coordinates of the arrow. FIG. 4D illustrates an example of converted addresses of the arrow which has been converted from the absolute coordinates of the arrow shown in FIG. 4C by the graphic data generating processor 3 based on linear and angular displacement data. FIG. 4G illustrates an example of converted addresses of a tail of the arrow, of the converted addresses of the arrow shown in FIG. 4D. FIG. 4H illustrates an example of trail generating addresses which are generated from the converted addresses of the tail of the arrow shown in FIG. 4G.

The object-throwing guide used in the object-throwing video game system serves to guide the game player as to the exact time at which a throwing body, such as a contestant, should hurl an object, such as a hammer, in a game space and the remaining number of times that the throwing body should turn, in order to hurl the object in a direction intended by the game player. As shown in FIG. 3A, the object-throwing guide comprises an arrow Na indicating a direction in which the throwing body hurls the object and a trail Lo of the arrow Na, the arrow Na and the trail Lo being displayed on the display screen of the television monitor 12. The direction indicated by the arrow Na agrees with the direction in which the throwing body hurls the object, as represented by the posture of the throwing body such as a contestant what is displayed together with the arrow Na. Stated otherwise, the arrow Na indicative of the throwing direction is displayed together with the throwing body from time to time depending on the posture of the throwing body which is also displayed from time to time on the display screen.

The arrow Na is displayed in successive positions on a path OR in the direction indicated by the arrows there-along. The image of the trail Lo which follows the arrow Na is generated and displayed using two address data a1, a2 of a trail of the arrow Na which is displayed in the present position and two address data b1, b2 of a trail of an arrow Nb which was displayed in a preceding position. Specifically, the image of the trail Lo comprises two triangles formed by interconnecting the address data a1 of the trail of the arrow Na and the address data b2 of the tail of the arrow Nb and interconnecting the address data a2 of the trail of the arrow Na and the address data b1 of the tail of the arrow Nb.

The number of turns that the throwing body has made is represented by a color of the arrow Na. For example, when a minimum value indicating the number of turns that the throwing body has made is the smallest, the color of the arrow Na is set to purple. As the value indicating the number of turns that the throwing body has made increases, the color of the arrow Na is successively set to warmer colors. When a maximum value indicating the number of turns that the throwing body has made is the largest, the color of the arrow Na is set to red. If the object-throwing video game played on the object-throwing video game system is shot put, then the arrow Na is displayed in red from the outset because the principal count of turns is 0.5 in shot put. If the object-throwing video game played on the object-throwing video game system is discus throw, then the arrow Na is displayed in yellow for the first turn and then in red for the second turn because the principal count of turns is 2 in discus throw. If the object-throwing video game played on the object-throwing video game system is hammer throw, then the arrow Na is displayed in purple for the first turn, in blue for the second turn, in green for the third turn, in yellow for the fourth turn, and then in red for the fifth turn. This is because the principal count of turns is set to 5 in hammer throw games on the object-throwing video game system though it is 4 in actual hammer throw contests. A color of the arrow Na is determined by the graphic command issuing means 1g which refers to a table based on a quotient (figures below the decimal point omitted) produced when the calculating means 1d divides throwing orientation angle data Ah by 360 (degrees). The table contains a number of quotients and color pallet address data or data indicative of colors which correspond respectively to the quotients.

In an object-throwing video game played on the object-throwing video game system, a throw failure is declared when the number of turns that the throwing body has made has exceeded the maximum value indicating the number of turns, i.e., a maximum count. The throw failure constitutes a foul in an actual object-throwing contest corresponding to the object-throwing video game.

The object-throwing guide described above is displayed on a real-time basis depending on the posture of the throwing body. Therefore, the game player is able to know the hurling direction and the remaining count of turns when the object is hurled by the throwing body at the present time. The game player can thus recognize a throwing direction and a time to hurl the object, as intended by the game player, based on the displayed object-throwing guide, and then operate the controller 22 to enable the throwing body to hurl the object based on the recognized throwing direction and time. The object-throwing video game system according to the present invention thereby provides a user-friendly interface for object-throwing video games.

A process of displaying the object-throwing guide will be described in detail below.

The arrow Na has a shape as shown in FIG. 3A, for example. The arrow Na has absolute addresses represented by coordinate data of the corners of a rectangular shape which surrounds the arrow Na on a three-dimensional plane having a center at "0". The absolute coordinate data of the arrow are loaded from the recording medium 30 (see FIG. 1) into the main memory 5. In the example shown in FIGS. 3B and 4B, the absolute coordinate data of the arrow are (x1, y1, z1)=(8, 0, 10), (x2, y2, z2)=(-8, 0, 10), (x3, y3, z3)=(8, 0, -10), and (x4, y4, z4)=(-8, 0, -10).

FIG. 3C illustrates the concept of an image conversion process which is carried out by the graphic data generating processor 3. When supplied with the absolute coordinate data of the arrow as shown in FIG. 3B and the linear and angular displacement data, the graphic data generating processor 3 establishes an arrow with three-dimensional coordinates as shown in FIG. 3C. It is assumed for illustrative purposes that the camera has its position and rotation angle fixed to be able to view the throwing body and the object at all times.

The address data of the vertices of the rectangular shape surrounding the arrow on three-dimensional plane are converted into address data in the display area of the buffer 11. An example of the converted address data of the arrow is shown in FIG. 4D. As shown in FIG. 4D, the converted address data of the arrow are address data in the display area of the buffer 11. For example, addresses a1, a2, a3, a4 in the display area of the buffer 11 of the corners of the rectangular shape which surrounds the arrow Na at the present time as shown in FIG. 3A are represented by (560, 320), (544, 324), (594, 368), and (560, 394) as shown in FIG. 4D. Addresses b1, b2, b3, b4 in the display area of the buffer 11 of the corners of the rectangular shape which surrounds the arrow Nb at the preceding time as shown in FIG. 3A are represented by (424, 342), (408, 346), (458, 390), and (424, 416) as shown in FIG. 4D.

The image of the trail Lo will be described below. It is assumed that the arrow Na is displayed at the present time, the arrow Nb at the preceding time which is a predetermined unit time prior to the present time, and any arrow which was displayed in the past is the arrow Nb only.

When the arrow Na is displayed as shown in FIG. 3A, the main memory 5 stores the converted address data of the arrow Na displayed at the present time and also the converted address data of the arrow Nb displayed at the preceding time, as shown in FIG. 4D. Furthermore, as shown in FIG. 4G, the main memory 5 also stores addresses of only tails of the arrows as converted address data, of the converted address data of the arrows shown in FIG. 4D. As can be seen from FIG. 3A, the addresses of the tails of the arrow Na at the present time and the arrow Nb at the preceding are indicated by a1, a2, and b1, b2. These addresses are represented by (560, 320), (544, 324) and (424, 342), (408, 346) as shown in a lower portion of FIG. 3A. These address values are stored as the converted address data of the tails of the arrows in another area of the main memory 5 than the area which stores the address data shown in FIG. 4D.

As shown in FIG. 4H, the converted address data of the tails of the arrows Na, Nb are supplied as trail generating address data from the main memory 5 to the graphic processor 10. When the graphic processor 10 receives a graphic command including the trail generating address data, the graphic processor 10 writes texture data of the arrows as trail image data in the display area of the buffer 11 based on the supplied trail generating address data. Then, the display screen of the television monitor 12 displays a trail image Lo as shown hatched in FIG. 3A. The trail image Lo gives the game player a visual illusion as if it looks like a trail of the arrow Na. In this manner, arrows and trails are displayed at successive locations to provide a visual representation as the path OR of the arrow.

In the above example, since two arrows are displayed successively at present and past, only one trail image Lo is displayed. If more arrows are successively displayed at successive times, then more trail images Lo are successively displayed, resulting in a longer combined trail image Lo displayed following the arrow which is displayed at a time on the display screen.

With the path OR of the arrow being expressed by the displayed trail image Lo, the game player can recognize a position in which the arrow will be displayed on the display screen, and hence can respond quickly to a throwing direction represented by the arrow. Stated otherwise, the game player can predict a position in which the arrow will be displayed more reliably and quickly when the path OR is displayed than when the path OR is not displayed, and hence can improve their response of maneuvering actions in the object-throwing video game when the arrow is displayed to point the direction for the throwing body to hurl the object.

Coloring of the arrow Na will be described below. As described above, the arrow Na changes its color depending on how many turns which the throwing object has made. Usually, cold colors are used to express small values such as low temperatures, and warm colors to express large values such as high temperatures. In this embodiment, as the number of turns which the throwing body makes increases, the arrow Na successively changes its color from a cold color toward a warm color. Therefore, the game player can recognize the remaining number of turns that the throwing object can make by seeing the color of the arrow Na. In other words, the game player can recognize the exact time at which he or she controls the throwing body to throw the object in the game space. The color of red is usually used to express a danger, a limitation, etc. As the color of the arrow Na becomes closer to red upon an increase in the number of turns that the throwing object has made, the game player can visually perceive for sure that the remaining number of turns that the throwing object can make is reduced.

Figure 5A:
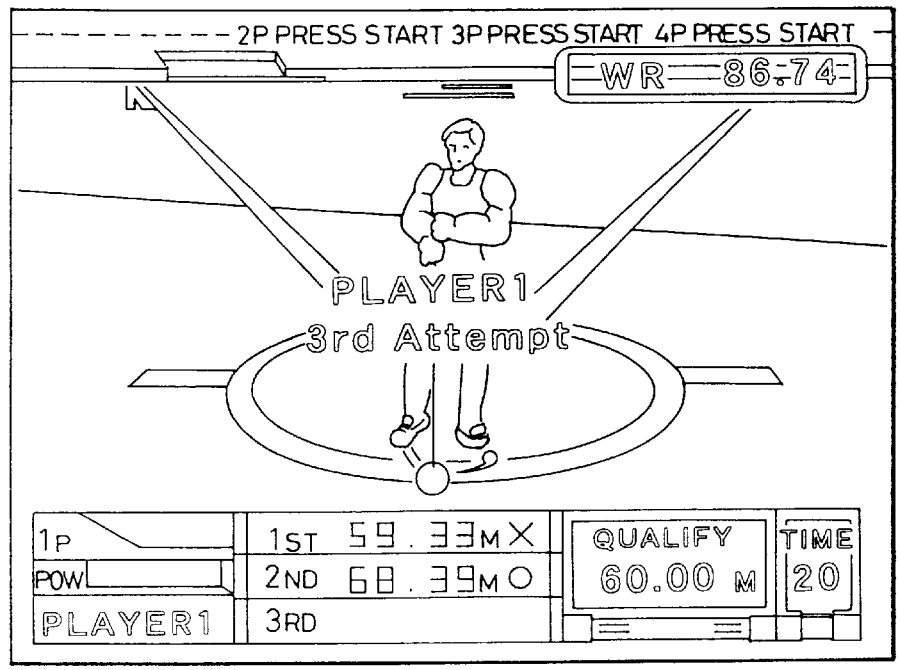
FIGS. 5A through 5D are views showing displayed images of a hammer-throwing game played on the object-throwing video game system shown in FIG. 1.
Figure 5B:
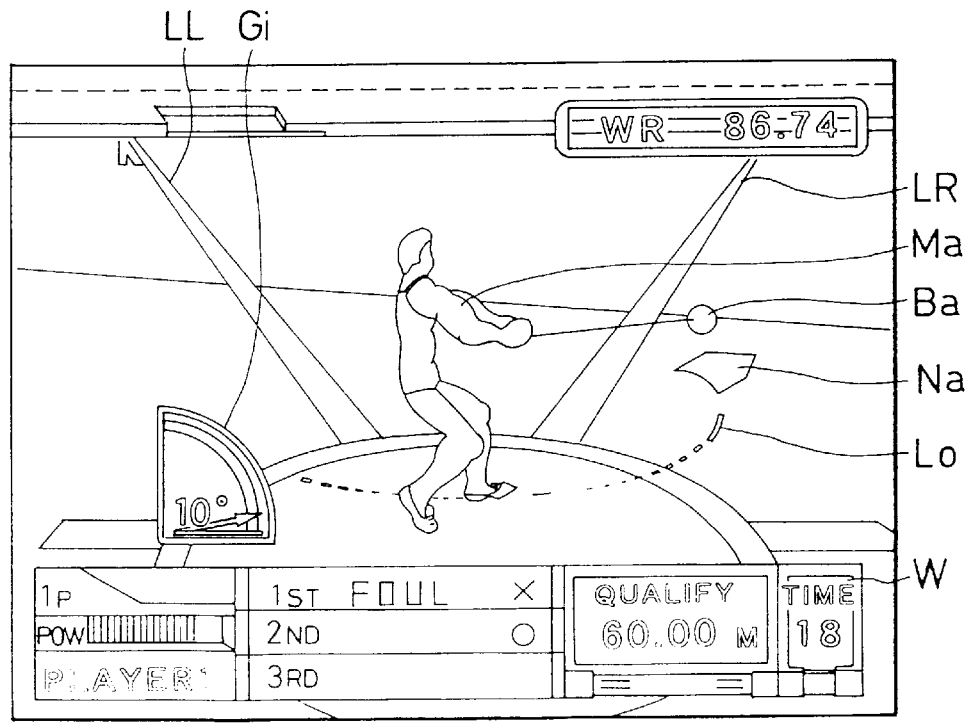
Figure 5C:
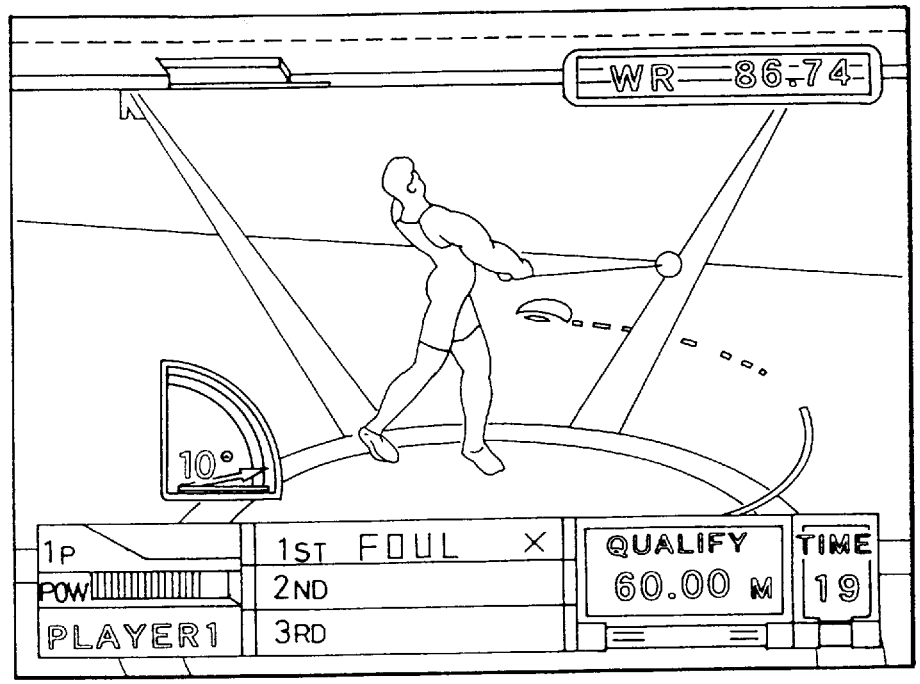
Figure 5D:
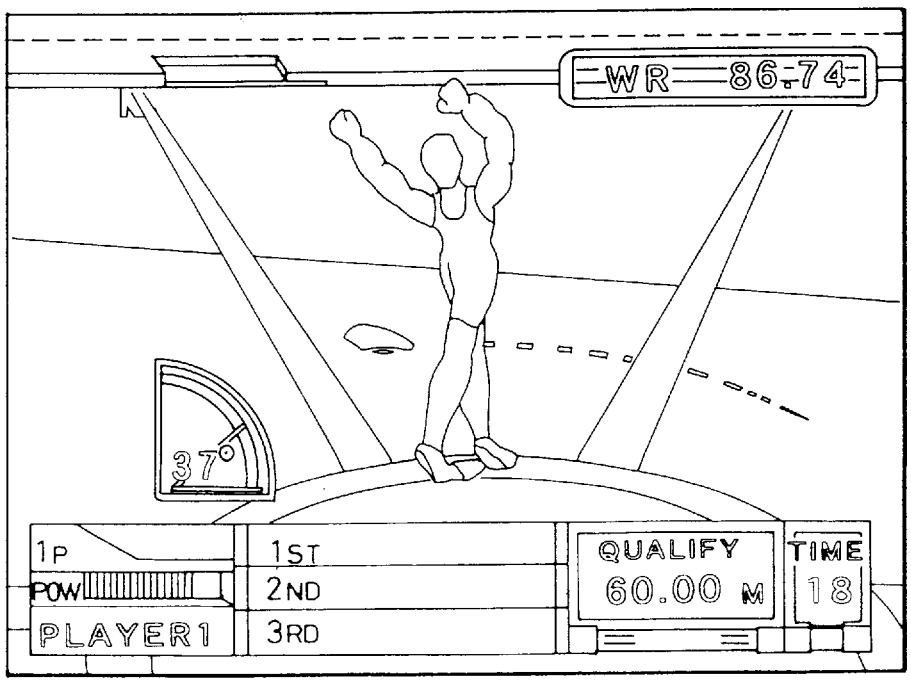

FIGS. 5A through 5D show displayed images of a hammer-throwing game played on the object-throwing video game system shown in FIG. 1. The displayed images shown in FIGS. 5A through 5D are four representative successive images out of a series of frames which show a contestant Ma in a game space as he makes progressive actions from starting to hurl a hammer Ba until ending the hurling of the hammer Ba. The displayed image shown in FIG. 5A shows the contestant Ma who starts to hurl the hammer Ba. The displayed image shown in FIG. 5B shows the contestant Ma who has just started to hurl the hammer Ba. The displayed image shown in FIG. 5C shows the contestant Ma who is going to release the hammer Ba. The displayed image shown in FIG. 5C shows the contestant Ma who has just hurled the hammer Ba. For the sake of brevity, reference characters are shown in FIG. 5B only. The displayed images shown in FIGS. 5A through 5D are selected from all images or frames of a plurality of hammer-throwing contests.

As shown in FIG. 5B, a displayed image or frame includes a background, the contestant Ma, the hammer Ba, the arrow Na, the trail Lo, a window W showing results, and a guide Gi showing an angle. The background includes sector lines LL, LR. The window W displays characters ("1P": one person in FIG. 5B) indicative of the number of game players in an upper area of a left end portion thereof, a bar graph indicative of throwing energy in a middle area of the left end portion thereof, and characters ("PLAYER1" in FIG. 5B) indicative of the number of the player in a lower area of the left end portion thereof. The window w also displays characters "1ST", "2ND", "3RD" in a central portion thereof, which indicate first, second, and third throws, respectively. To the right of the characters "1ST", "2ND", "3RD", there are displayed characters indicative of a distance which the hammer has flied or a foul. In FIG. 5A, "59.33M" indicative of the distance of 59 m and 33 cm is displayed for the first throw, and "68.39M" indicative of the distance of 68 m and 39 cm is displayed for the second throw. A symbol "x" displayed to the right of the characters "1ST" and a symbol "O" displayed to the right of the characters "2ND" jointly indicate that the distance for the second throw is valid rather than the distance for the first throw. In FIG. 5B, the characters "FOUL x" are displayed for the first throw, showing that the first throw was a failure or a foul.

As shown in FIG. 5B, the trail Lo is displayed such that it is larger toward the arrow Na and smaller away from the arrow Na.

E. Control Sequence According to a Main Routine:

FIGS. 6 through 9 show flowcharts of a control sequence according to a main routine of a game program which controls the object-throwing video game system shown in FIG. 1. In an object-throwing video game played on the object-throwing video game system shown in FIG. 1, an object is hurled by a throwing body in a game space depending on how the game player operates the controller 22. Object-throwing contests which can be simulated by object-throwing video games played on the object-throwing video game system shown in FIG. 1 include shot put, hammer throw, and discus throw, for example. If the object-throwing video game in the main routine shown in FIGS. 6 through 9 is shot put, then the throwing body represents a contestant and the object represents a shot. If the object-throwing video game in the main routine shown in FIGS. 6 through 9 is discus throw, then the throwing body represents a contestant and the object represents a discus. If then the object-throwing video game in the main routine shown in FIGS. 6 through 9 is hammer throw, then the throwing body represents a contestant and the object represents a hammer.

The control sequence shown in FIG. 6 includes a step S1 which is executed by the operating system stored in the ROM 6 shown in FIG. 1, and other steps which are executed based on the game program data read from the recording medium 30. The steps based on the game program data are executed by the various functions or means of the CPU 1 as shown in FIG. 2.

As shown in FIG. 6, the operating system instructs the recording medium driver 19 to read graphic data, audio data, and game program data from the recording medium 30 in a step S1. Of the data read from the recording medium 30, the game program data are stored in the main memory 5, and imparts the functions or means shown in FIG. 2 to the CPU 1. The graphic data, i.e., texture data, are stored in the buffer 11 connected to the graphic processor 10, and are assigned respective texture data numbers. The audio data are stored in the buffer 14 connected to the audio processor 13, and are assigned respective audio data numbers. Usually, not all the graphic and audio data are stored in the buffers 11, 14 in the step S1. However, it is assumed for illustrative purposes that all the graphic and audio data are loaded from the recording medium 30 in the step S1.

In a step S2, the button operation detecting means 1a determines whether the start button 22a of the controller 22 has been pressed or not by the game player. If pressed (YES), then control proceeds to a step S3.

In the step S3, the graphic command issuing means 1g issues a graphic command for displaying a game selection image to the graphic processor 10. Based on the supplied graphic command, the graphic processor 10 stores graphic data of the game selection image in the display area of the buffer 11 and displays the game selection image on the display screen of the television monitor 12.

In a next step S4, the button operation detecting means 1a determines whether the start button 22a of the controller 22 has been pressed or not by the game player. If pressed (YES), then control proceeds to a step S5.

Before the start button 22a is pressed by the game player, the game player selects a desired video game, here a golf game, on the game selection image using the arrow keys. After the game player has selected a desired video game, the game player presses the start button 22a. The selection of some of the games on the game selection image, such as a martial arts game, includes choosing characters and other items for the game.

In the step S5, it is assumed that an object-throwing game has been selected, and the CPU 1 is set to the selected game.

In a step S6, the graphic command issuing means 1g issues a graphic command for displaying an initial image of the selected game to the graphic processor 10. The graphic processor 10 stores graphic data of the initial image in the display area of the buffer 11 and displays the initial image on the display screen of the television monitor 12.

In a step S7, the variable setting means 1h resets flags and variables held in the main memory 5.

In a step S8, the button operation detecting means 1a determines whether the first button 22c of the controller 22 has been pressed or not by the game player. If pressed (YES), then control proceeds to a step S9. If not (NO), then control proceeds to a step S11. The first button 22c is used to control the speed of rotation of the throwing body in the game space.

In the step S9, the calculating means 1d adds rising reference speed data s to speed data Sd.

In a next step S10, the frame number acquiring means 1i determines frame number data fd depending on the speed data Sd. The frame number data fd is referred to as converted frame number data. The converted frame number data fd is determined from a table which is referred to by the frame number acquiring means 1i. The table comprises a number of speed data Sd and a number of frame number data registered with respect to the respective speed data Sd, and is loaded from the recording medium 30 into the main memory 5. A frame number may be calculated from the speed data Sd rather than using the table.

In the step S11, the calculating means 1d subtracts lowering reference speed data m from the speed data Sd.

In a step S12, the decision means 1f determines whether the value of the speed data Sd is negative or not. If it is negative (YES), then control proceeds to a step S13, and if it is not negative (NO), then control jumps to the step S10.

In the step S13, the variable setting means 1h sets the speed data Sd to "0".

As described above, the button operation detecting means 1a determines whether the first button 22c of the controller 22 has been pressed or not by the game player in the step S8, and if the first button 22c has been pressed, then the speed data Sd is increased in the step S9, and if the first button 22c has not been pressed, then the speed data Sd is decreased in the step S11. This is to establish the value of the speed data Sd depending on the number of times that the game players presses the first button 22c per unit time. If the number of times that the game players presses the first button 22c per unit time is large, then the speed of rotation of the throwing body in the game space, i.e., the throwing energy, is increased. Conversely, if the number of times that the game players presses the first button 22c per unit time is small, then the speed of rotation of the throwing body in the game space, i.e., the throwing energy, is reduced. The throwing energy as it changes is expressed by a change in the bar graph shown in FIGS. 5A through 5D.

Figure 7:
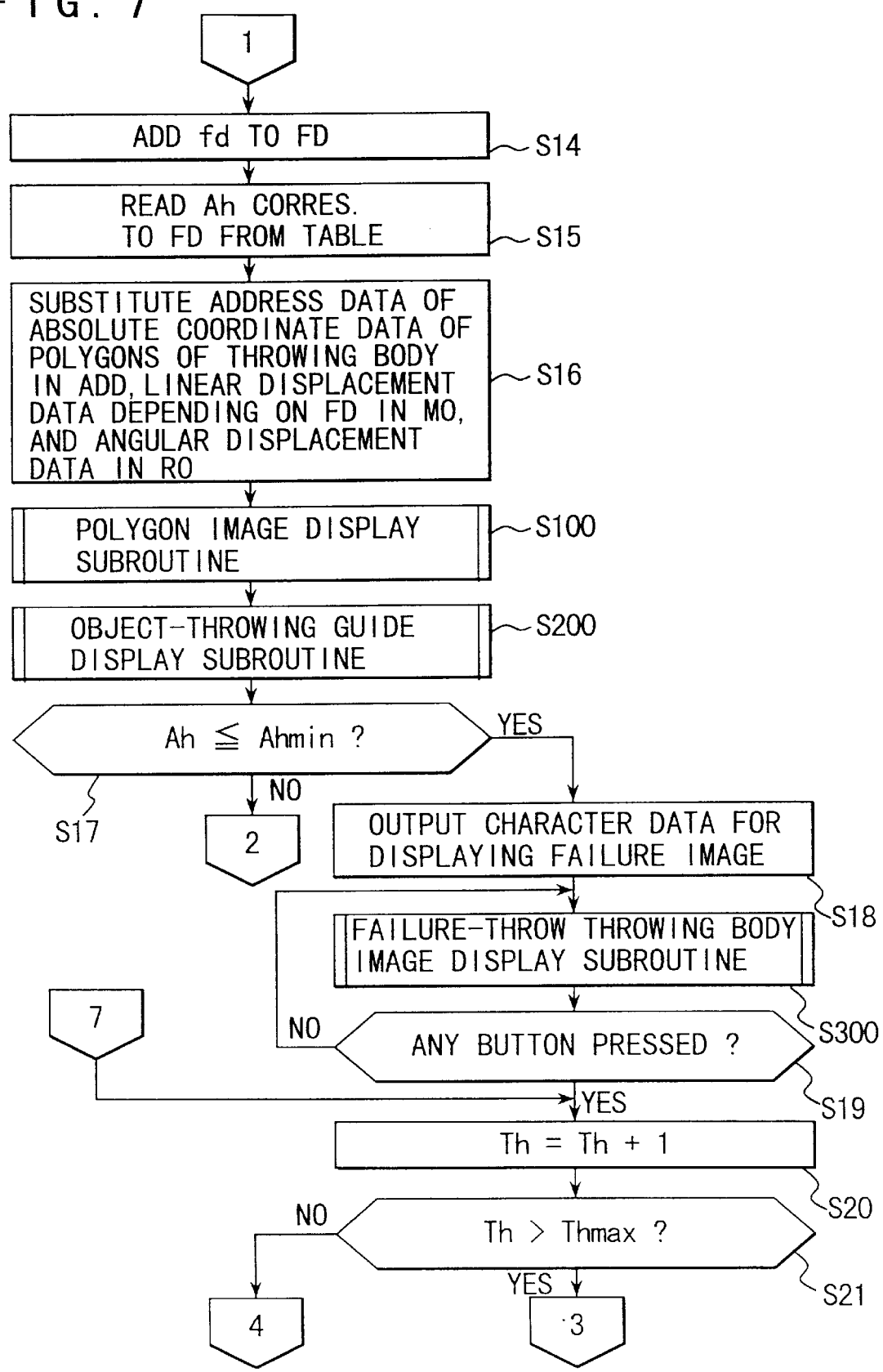
Figure 8:
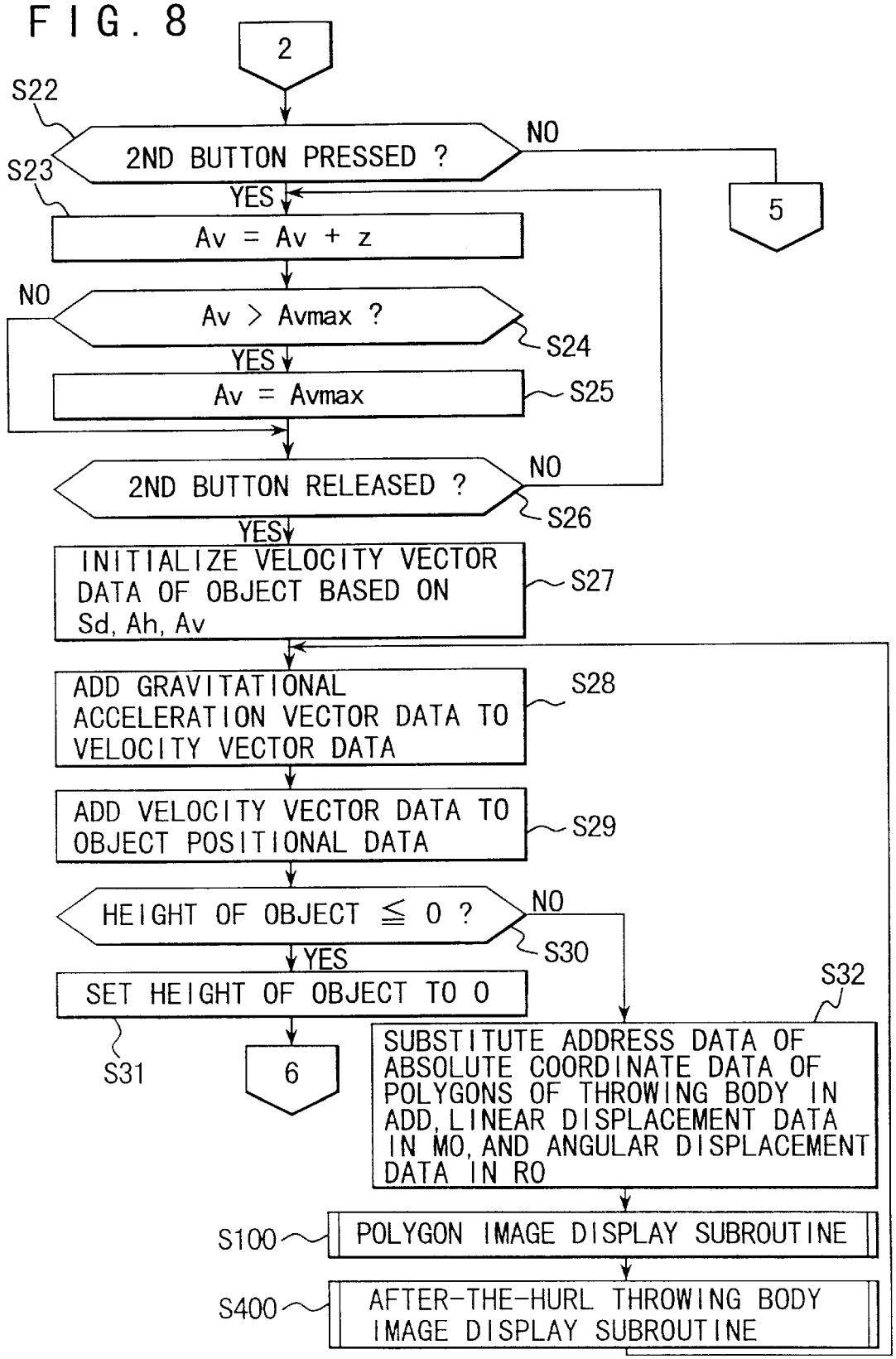
Figure 9:
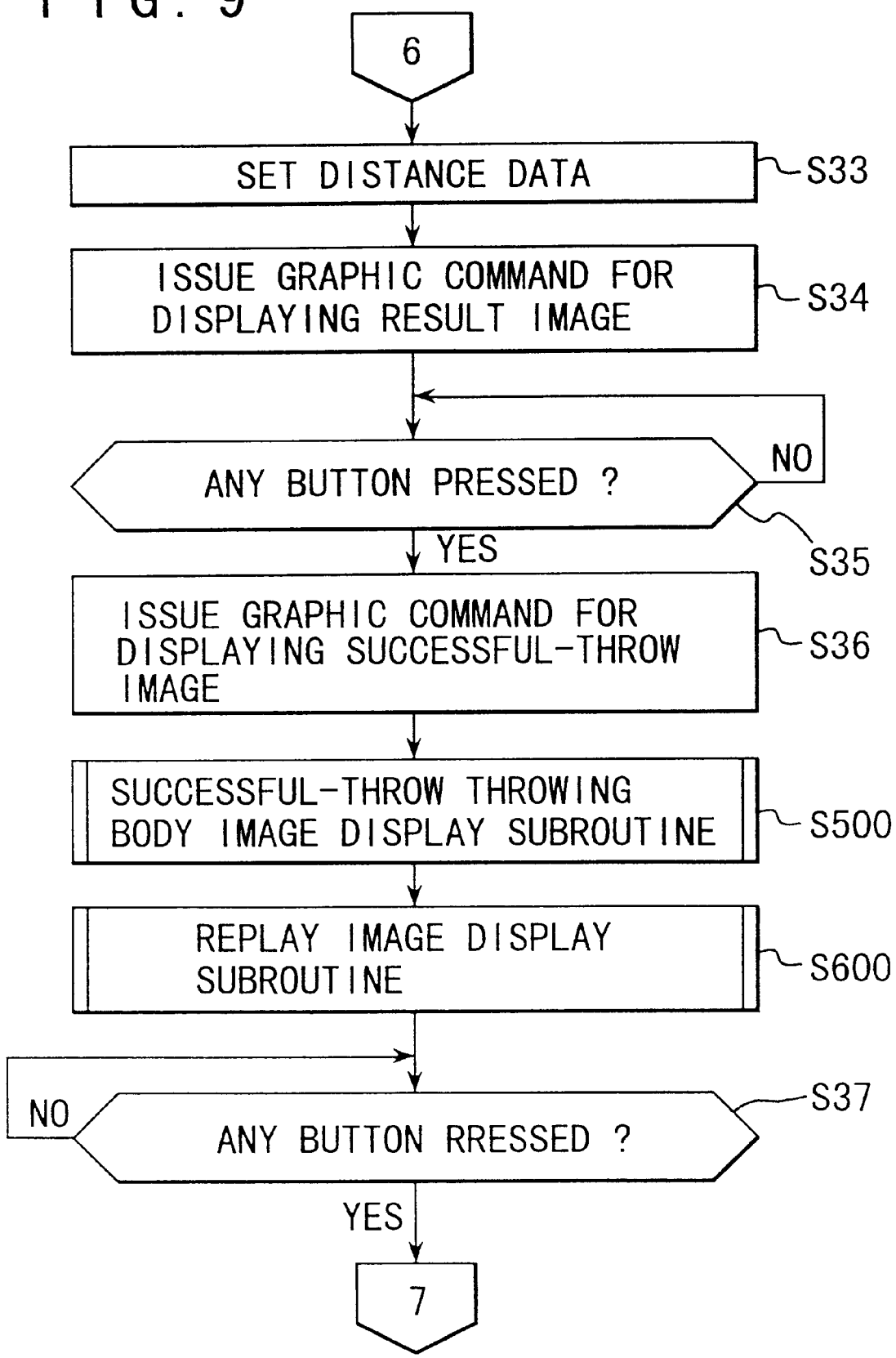

As shown in FIG. 7, the calculating means 1d adds the converted frame number data fd to frame number data FD in a step S14.

In a next step S15, the frame number acquiring means 1i reads throwing orientation angle data Ah corresponding to the frame number data FD determined in the step S14 from a table TBL stored in the main memory 5. As shown in FIG. 4A, the table TBL comprises a number of frame number data FD and a number of throwing orientation angle data Ah registered with respect to the frame number data FD, respectively.

In a step S16, the variable setting means 1h reads address data in the main memory 5 of absolute coordinate data of polygons of the throwing body and linear and angular displacement data depending on the frame number data FD from a table, and substitutes the address data in an address variable ADD, the linear displacement data in a linear displacement variable MO, and the angular displacement data in an angular displacement variable RO. The address data, the linear displacement data, and the angular displacement data are obtained from a table which comprises frame numbers ranging from a minimum value to a maximum value, and a number of address data, linear displacement data, and angular displacement data which are registered with respect to the frame numbers.

In a step S100, a polygon image display subroutine is executed. The polygon image display subroutine will be described later on.

In a step S200, an object-throwing guide display subroutine is executed. The object-throwing guide display subroutine will be described later on.

In the step S17, the decision means 1f determines whether or not the throwing orientation angle data Ah has a value equal to or smaller than a minimum throwing orientation angle Ahmin. If the value of the throwing orientation angle data Ah is equal to or smaller than the minimum throwing orientation angle Ahmin (YES), then control goes to a step S18. If not (NO), then control goes to a step S22 (see FIG. 8). As shown in FIG. 4A, the minimum throwing orientation angle Ahmin is a minimum angle at which the object falls in an invalid area with a margin. The invalid area is an area outside of a throwing sector which is defined between the sector lines LL, LR as shown in FIGS. 4B and 5A through 5D.

In the embodiment, the maximum number of turns which the object makes before it is hurled is set to "0.5" for shot put, "2" for discus throw, and "5" for hammer throw. A maximum value of the frame number is determined depending on the maximum number of turns which the object makes. If the maximum number of turns which the object makes in a certain contest is "4" and the maximum value of the frame number therefor is set to "240", then the maximum value of the frame number for a contest whose maximum number of turns which the object makes is "2" is "120".

In the step S18, since the value of the throwing orientation angle data Ah is equal to or smaller than the minimum throwing orientation angle Ahmin, the throw is a failure which means a foul. Therefore, the result information setting means 1e supplies character data indicative of "FOUL x" to the graphic processor 10. The window W now displays characters "FOUL x" in its central portion as shown in FIG. 5B.

In a next step S300, a throwing body failure image display subroutine is executed. The throwing body failure image display subroutine is a combination of a process in a step S32 (described later on) and the polygon image display subroutine in the step S100. When the throwing body failure image display subroutine is executed, a motion of the throwing body at the time of a failure, e.g., kneeing down, is displayed on the display screen.

In a step S19, the decision means 1f determines whether any button on the controller 22 has been pressed or not by the game player based on data from the button operation detecting means 1a. If either one of the buttons has been pressed (YES), then control goes to a step S20. If not (NO), then control returns to the step S300.

In the step S20, the calculating means 1d adds "1" to throw count data Th.

In a next step S21, the decision means 1f determines whether the throw count data Th is greater than a maximum throw count Thmax or not. If the throw count data Th is greater than the maximum throw count Thmax (YES), then control goes back to the step S3. If not (NO), then control goes back to the step S8.

In the step S22 (see FIG. 8), the button operation detecting means 1a determines whether the second button 22d of the controller 22 has been pressed or not by the game player. If pressed (YES), then control proceeds to a step S23. If not (NO), then control goes back to the step S8. The second button 22d is used to determine vertical throw angle data Av of the object and a time at which to hurl the object. In this embodiment, the vertical throw angle data Av is successively incremented insofar as the second button 22d is pressed. The vertical throw angle data Av is displayed on a real-time basis by the guide Gi as shown in FIGS. 5A through 5D.

In a step S23, the calculating means 1d adds reference angle data z to the vertical throw angle data Av.

In a step S24, the decision means 1f determines whether the vertical throw angle data Av has a value greater than a maximum vertical throw angle Avmax or not. If the value of the vertical throw angle data Av is greater than the maximum vertical throw angle Avmax (YES), then control proceeds to a step S25. If not (NO), then control jumps to a step S26.

In the step S25, the variable setting means 1h substitutes the maximum vertical throw angle Avmax in the vertical throw angle data Av.

In the step S26, the button operation detecting means 1a determines whether the second button 22d has been released or not by the game player. If released (YES), then control proceeds to a step S27. If not (NO), then control goes back to the step S23. When the second button 22d is released, the object is hurled by the throwing body in the game space at a vertical angle represented by the vertical throw angle data Av at the time.

In the step S27, the variable setting means 1h initializes velocity vector data of the object based on the value of the speed data Sd, the throwing orientation angle data Ah, and the vertical throw angle data Av. The velocity vector data represents a position in a three-dimensional coordinate system, and comprises values (x, y, z). Initializing velocity vector data means establishing the velocity vector data the above three values (x, y, z).

In a step S28, the calculating means 1d adds gravitational acceleration vector data to the velocity vector data that has been initialized in the step S27. The gravitational acceleration vector data is a constant for varying the position in the three-dimensional coordinate system which is represented by the velocity vector data with the values (x, y, z).

In a step S29, the calculating means 1d adds the velocity vector data (x, y, z) to positional data of the object. The positional data of the object represents the position of the object in the three-dimensional coordinate system, and comprises values (x, y, z).

In a step S30, the decision means 1f determines whether or not the height of the object is equal to or smaller than "0". If the height of the object is "0" (YES), then control proceeds to a step S31. If not (NO), then control goes to a step S32. The height of the object represents the height of the object on the display screen in each frame.

In the step S31, the variable setting means 1h sets the height of the object to "0".

In the step S32, the variable setting means 1h substitutes address data in the main memory 5 of absolute coordinate data of polygons of the object in the address variable ADD, the linear displacement data in the linear displacement variable MO, and the angular displacement data in the angular displacement variable RO. The linear displacement data and the angular displacement data are obtained from a table which comprises positional data of the object ranging from a minimum value to a maximum value, and a number of linear displacement data and angular displacement data which are registered with respect to the positional data.

In a next step S100, the polygon image display subroutine is executed.

In a next step S400, an after-the-hurl throwing body image display subroutine is executed. The after-the-hurl throwing body image display subroutine in the step S400 is a combination of the process in the step S32 and the polygon image display subroutine in the step S100.

In a step S33 (see FIG. 9) following the step S31, the calculating means 1d determines a distance which the object has flied. The result information setting means 1e supplies character data indicative of the determined distance to the graphic processor 10.

In a step S34, the graphic command issuing means 1g supplies a graphic command for displaying an image of the results to the graphic processor 10. The display screen of the television monitor 12 now displays in the central portion of the window W shown in FIGS. 5A through 5D characters indicative of the distance which the object has flied.

In a step S35, the decision means 1f determines whether any button on the controller 22 has been pressed or not by the game player based on data from the button operation detecting means 1a. If either one of the buttons has been pressed (YES), then control goes to a step S36.

In the step S36, the graphic command issuing means 1g issues a graphic command for displaying an image which shows that the throw has been successful to the graphic processor 10. The graphic processor 10 writes image data representing that the throw has been successful in the display area of the buffer 11. The display screen of the television monitor 12 now displays an image which shows that the throw has been successful. The image which shows that the throw has been successful may comprise characters "GOOD", for example, and is displayed in the central portion of the window W shown in FIGS. 5A through 5D.

In a step S500, a successful-throw throwing body image display subroutine is executed. The successful-throw throwing body image display subroutine in the step S500 is a combination of the process in the step S32 and the polygon image display subroutine in the step S100. In the successful-throw throwing body image display subroutine, a motion of the throwing body at the time the throw has been successful, e.g., a jumping throwing body, is displayed on the display screen.

In a step S600, a replay image display subroutine is executed. The replay image display subroutine uses information of operations of the controller 22 by the game player. Specifically, all information of operations of the controller 22 by the game player is stored in the main memory 5. In the replay image display subroutine, all information of operations of the controller 22 by the game player is read from the main memory 5 and processed to display images based on the past operations of the controller 22 by the game player.

In a step S37, the decision means 1f determines whether any button on the controller 22 has been pressed or not by the game player based on data from the button operation detecting means 1a. If either one of the buttons has been pressed (YES), then control goes to the step S20.

Figure 11:
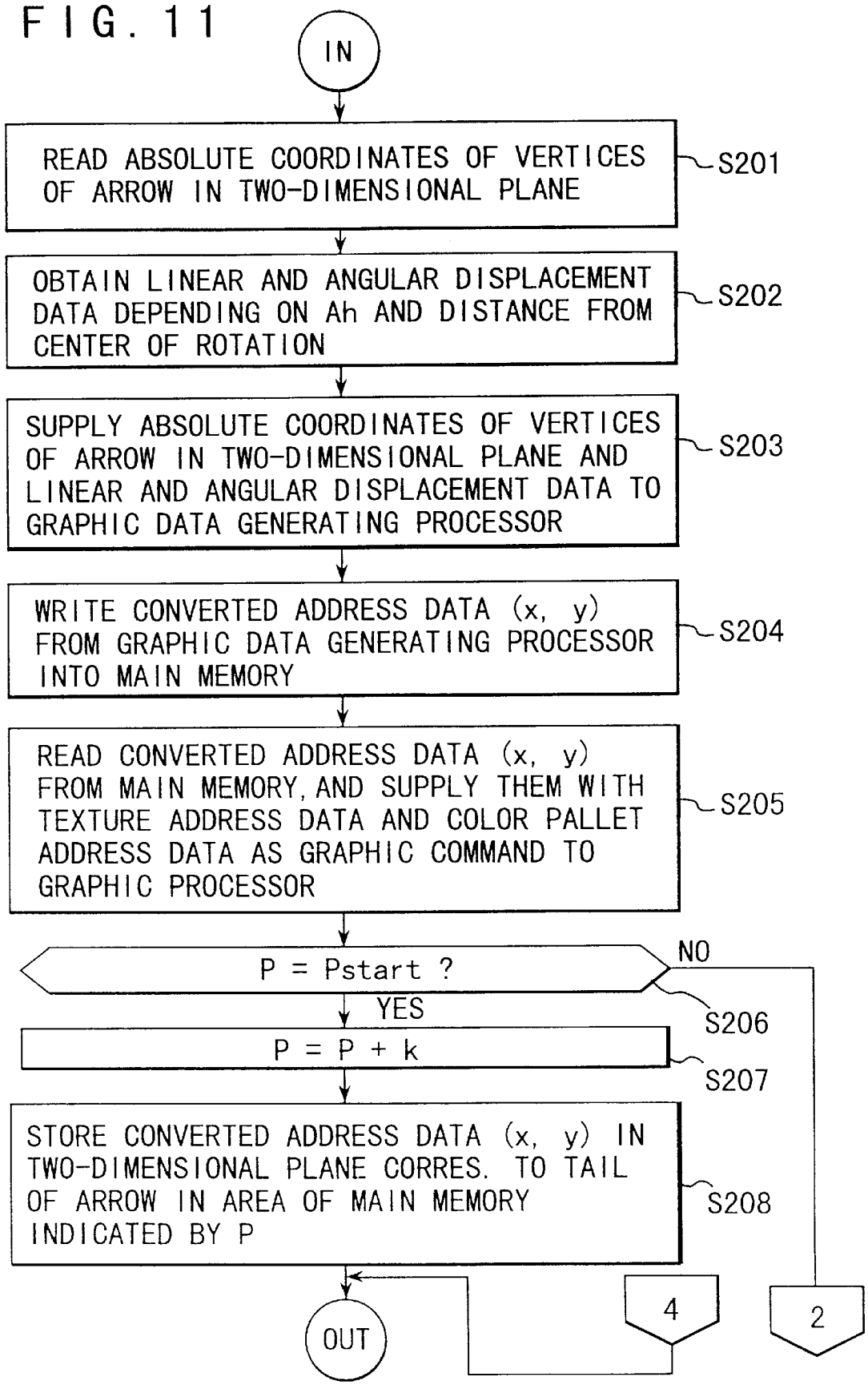

F. Control Process of the Polygon Image Display Subroutine in the Step S100:

FIG. 11 shows a control sequence according to the polygon image display subroutine in the step S100. In the polygon image display subroutine, polygons of the throwing body and the object are displayed. Each of the throwing body and the object comprises a number of polygons. As shown in FIG. 4E, absolute coordinate data (x, y, z) of vertices of those polygons are stored in the main memory 5. The absolute coordinate data (x, y, z) are converted into converted polygon address data (x, y) on a two-dimensional plane as shown in FIG. 4F by the graphic data generating processor 3 based on the linear and angular displacement data. The converted polygon address data shown in FIG. 4F are supplied together with the texture address data and the color pallet address data as a graphic command to the graphic processor 10. In response to the graphic command, the graphic processor 10 writes texture data into the display area of the buffer 11 based on the converted polygon address data. The display screen of the television monitor 12 now displays the throwing object and the object, each composed of many polygons.

Figure 10:
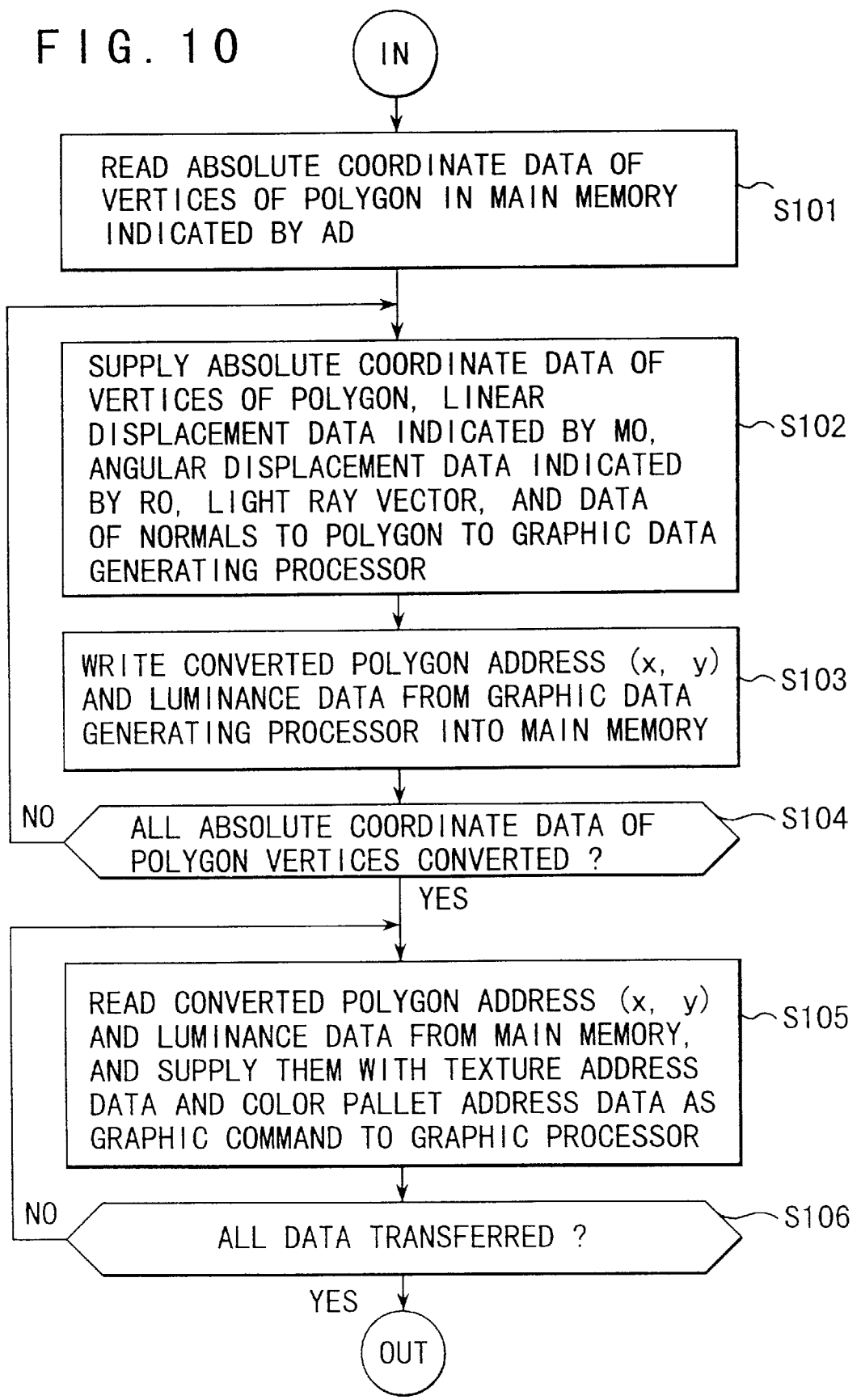
FIG. 10 is a flowchart of a control sequence according to a polygon image display subroutine included in the main routine.

In a step S101 shown in FIG. 10, the polygon information managing means 1k reads the absolute coordinate data (x, y, z) of vertices of a polygon in the main memory 5 which is indicated by the value of the address variable ADD from the main memory 5.

In a step S102, the polygon information managing means 1k supplies the absolute coordinate data of the vertices of the polygon, the linear displacement data in the linear displacement variable MO, the angular displacement data in the angular displacement variable RO, the vector of light rays, and the data of normals to the polygon to the graphic data generating processor 3. Based on the supplied data, the graphic data generating processor 3 determines the converted polygon address data (x, y) and luminance data, and supplies the determined data to the polygon information managing means 1k.

In a step S103, the polygon information managing means 1k writes the converted polygon address data (x, y) and luminance data from the graphic data generating processor 3 into the main memory 5.

In a step S104, the decision means 1f determines whether all the converted polygon address data of the vertices of the polygons have been converted into converted polygon address data or not. If all the converted polygon address data have been converted into converted polygon address data (YES), then control proceeds to a step S105. If not (NO), then control returns to the step S102.

In the step S105, the graphic command issuing means 1g reads the converted polygon address data (x, y) and luminance data from the main memory 5, and supplies the converted polygon address data (x, y) and luminance data together with the texture address data and the color pallet address data as a graphic command to the graphic processor 10. In response to the graphic command, the graphic processor 10 writes texture data of the throwing object into the display area of the buffer 11 based on the converted polygon address data (x, y). The display screen of the television monitor 12 now displays the throwing object and the object, each composed of many polygons.

In a step S106, the decision means 1f determines whether all the data have been transferred or not. If all the data have been transferred (YES), then the polygon image display subroutine is finished. If not (NOT), then control goes back to the step S105.

Figure 12:
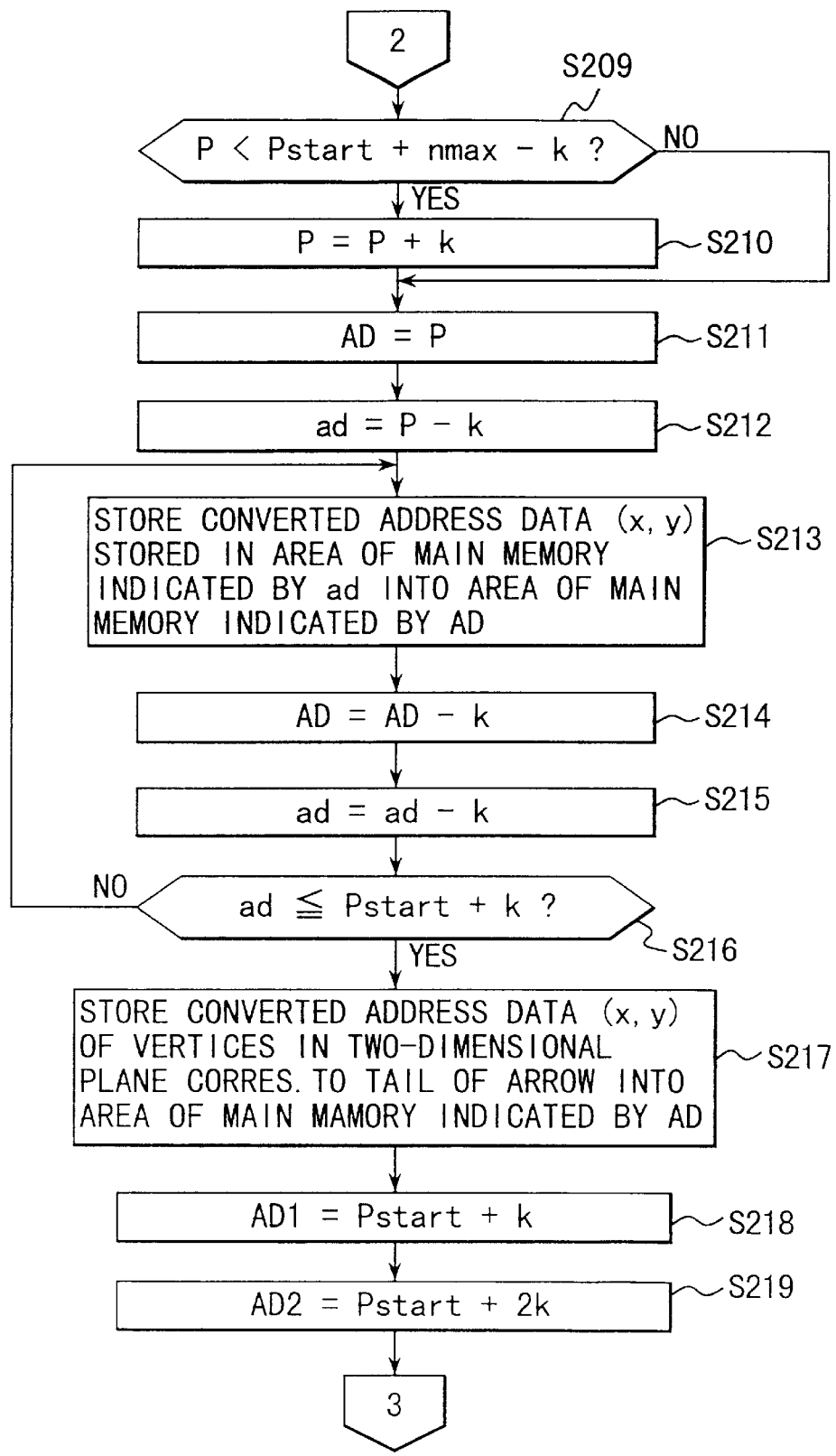

G. Control Process According to the Object-throwing Guide Display Subroutine in the Step S200:

FIGS. 11 through 13 show a control sequence according to the object-throwing guide display subroutine in the step S200.

In a step S201 shown in FIG. 11, the guide information managing means 1m reads the absolute coordinate data of the vertices of a rectangular shape which surrounds the arrow from the main memory 5.

In a step S202, the linear and angular displacement acquiring means 1j obtains linear and angular displacement data in a three-dimensional coordinate system of a rectangular shape which surrounds the arrow, depending on the value of the throwing orientation angle data Ah and distance data from the center O of rotation shown in FIG. 3A. The distance data has a fixed value.

In a step S203, the guide information managing means 1m supplies the absolute coordinate data of the arrow, the linear displacement data, and the angular displacement data to the graphic data generating processor 3. The graphic data generating processor 3 converts the absolute coordinate data of the arrow into coordinate data in the three-dimensional coordinate system based on the linear displacement data and the angular displacement data, produces converted address data (x, y) in the two-dimensional coordinate system from the coordinate data, and supplies the converted address data (x, y) to the guide information managing means 1m.

In a step S204, the guide information managing means 1m writes the converted address data (x, y) from the graphic data generating processor 3 into the main memory 5.

In a step S205, the graphic command issuing means 1g reads the converted address data (x, y) from the main memory 5, and supplies the converted address data (x, y) together with texture address data and color pallet address data as a graphic command to the graphic processor 10. The graphic command issuing means 1g obtains the color pallet address data for displaying the arrow in a color depending on the number of turns, based on a calculated value from the calculating means 1d. The calculated value is determined by the calculating means 1d which divides the throwing orientation angle data Ah by 360 (degrees). Based on the converted address data (x, y), the graphic processor 10 writes texture data of the arrow with a color indicated by a color pallet into the display area of the buffer 11.

The color is determined by referring to a table which comprises quotients ranging from a minimum value to a maximum value which are determined by the calculating means 1d, and color-indicating data or color pallet address data registered with respect to the respective quotients.

In a step S206, the decision means 1f determines whether the value of an address pointer P is a start address Pstart or not. If the value of the address pointer P is the start address Pstart (YES), then control proceeds to a step S207. If not (NO), then control jumps to a step S209 (see FIG. 12). The start address Pstart is a start address of an area where the converted address data is stored.

In the step S207, the calculating means 1d adds a reference address number k to the address pointer P. The value of the reference address number k represents a storage capacity required for storing two address data.

In a next step S208, the guide information managing means 1m stores the two-dimensional converted address data (x, y) corresponding to the tail of the arrow in an area of the main memory 5 which is indicated by the address pointer P. Then, the object-throwing guide display subroutine comes to an end.

In the step S209 shown in FIG. 12, the calculating means 1d determines whether the value of the address pointer P is smaller than the difference produced when the reference address number k is subtracted from the sum of the start address Pstart and a maximum stored number nmax of converted address data or no. If the value of the address pointer P is smaller than the difference (YES), then control goes to a step S210. If not (NO), then control jumps to a step S211. The maximum stored number nmax of converted address data has a minimum unit of k. The step S209 is carried out to limit the value of the address pointer P for thereby making arcuate in shape the path represented by the trail Lo. If the value of the address pointer P not limited in the step S209, then the path represented by the trail Lo would be circular in shape.

In the step S210, the calculating means 1d adds the reference address number k to the address pointer P.

In the step S211, the value of the address pointer P is substituted in a rearward address AD.

In a step S212, the guide information managing means 1m substitutes a value which is smaller than the value of the address pointer P by "k" in a forward address ad. The value represented by the rearward address AD and the value represented by the forward address ad are related as follows:

$$AD < ad.$$

In a step S213, the guide information managing means 1m stores the converted address data (x, y) stored in an area of the main memory 5 which is indicated by the forward address ad into an area of the main memory 5 which is indicated by the rearward address AD.

In a step S214, the calculating means 1d subtracts the reference address number k from the rearward address AD.

In a step S215, the calculating means 1d subtracts the reference address number k from the forward address ad.

In a step S216, the decision means 1f determines whether or not the value of the forward address ad is equal to or smaller than the sum of the start address Pstart and the reference address number k. If the value of the forward address ad is equal to or smaller than the sum of the start address Pstart and the reference address number k (YES), then control proceeds to a step S217. If not (NO), then control goes back to the step S213.

The steps S209~S216 serve as a process for shifting the converted address data (x, y) corresponding to the tail of the arrow successively to areas indicated by greater addresses, and function as a shift register. The address pointer P is substituted in the rearward address AD in the step S211 and the data which is smaller than the address pointer P by "k" is substituted in the forward address ad in the step S212 for the purpose of storing the converted address data (x, y) stored in the area indicated by the forward address ad into the area indicated by the rearward address AD. This process functions as a shift register. The reference address number k is subtracted from the rearward address AD in the step S214, the reference address number k is subtracted from the forward address ad in the step S215, and whether or not the value of the forward address ad is equal to or smaller than the sum of the start address Pstart and the reference address number k is determined in the step S216 in order to determine whether there is an area available for storing the converted address data (x, y) stored in the forward address ad. If the value of the forward address ad is equal to or smaller than the sum of the start address Pstart and the reference address number k, then there is no storage area corresponding to the rearward address AD.

In the step S217, the guide information managing means 1m stores the converted address data (x, y) of a two-dimensional vertex corresponding to the tail of the arrow into an area of the main memory 5 which is indicated by the rearward address AD.

In a step S218, the variable setting means 1h places the sum of the start address Pstart and the reference address number k in a first address AD1 of the main memory 5.

In a step S219, the variable setting means 1h places the sum of the start address Pstart and a value 2k which is twice the reference address number k in a second address AD2 of the main memory 5.

In a step S220 (see FIG. 13), the guide information managing means 1m reads the converted address data (x, y) from the first and second addresses AD1, AD2 of the main memory 5, and supplies the converted address data (x, y) together with texture address data and color pallet data as a graphic command to the graphic processor 10. The data stored in the first address AD1 of the main memory is the converted address data corresponding to the tail of the arrow which is displayed at the present time. The data stored in the second address AD2 of the main memory is the converted address data corresponding to the tail of the arrow which was displayed at a time that precedes the present time by a unit period. Therefore, the converted address data (x, y) of the tail of the arrow which is displayed at the present time and also the converted address data (x, y) of the tail of the arrow which was displayed at the time that precedes the present time by the unit period are supplied as address data of one image to the graphic processor 10. Therefore, the graphic processor 10 writes the texture data of the arrow as texture data of the trail Lo into the display area of the buffer 11 based on the above four items of the converted address data (x, y). The color of the trail Lo displayed at this time is the same as the color of the arrow Na which is being displayed at the present time.

In a step S221, the calculating mans 1d adds the reference address number k to the first address AD1.

In a step S222, the calculating mans 1d adds the reference address number k to the second address AD2.

In a step S223, the decision means 1f determines whether or not the value of the first address AD1 is equal to or greater than the value of the address pointer P. If the value of the first address AD1 is equal to or greater than the value of the address pointer P (YES), then the object-throwing guide display subroutine is brought to an end. If not (NO), then control goes back to the step S220.

The steps S217~S223 serve to supply two areas of the converted address data (x, y) stored in the main memory 5 as vertex address data of a single rectangular shape to the graphic processor 10. The sum of the start address Pstart and the reference address number k are placed in the first address AD1 in the step S218, and the sum of the start address Pstart and the value 2k which is twice the reference address number k is placed in the second address AD2 in the step S218 in order to supply the converted address data (x, y) corresponding to the tail of an arrow and the converted address data (x, y) corresponding to the tail of an arrow which is displayed as preceding the above arrow as converted address data of one image to the graphic processor 10.

The reference address number k is added to the first address AD1 in the step S221, the reference address number k is added to the second address AD2 in the step S222, and whether or not the value of the first address AD1 is equal to or greater than the value of the address pointer P is determined in the step S223 in order to determine whether or not there is converted address data (x, y) in the second address AD2 which is to be paired with the converted address data (x, y) in the first address AD1. If the value of the first address AD1 is equal to or greater than the value of the address pointer P, then there is no corresponding converted address data (x, y) in the second address AD2.

In the illustrated embodiment, the color of the arrow Na is variable depending on the number of turns which the throwing body has made. However, the color of the arrow Na may be changed based on an accumulated value of the throwing orientation angle data Ah, so that the color of the arrow Na may be changed in finer variations. In this modification, the color of the arrow Na is also changed from a cold color to a warm color as the accumulated value increases. Because the arrow Na can be displayed in an increased number of colors, it permits the game player to recognize the time at which to hurl the object with greater accuracy.

In the illustrated embodiment, the displayed image of the trail Lo has the same color as the displayed image of the arrow Na. However, the displayed image of the trail Lo may be white in color. Since the game player can visually distinguish the different colors of the trail Lo and the arrow Na reliably from each other, the game player can visually perceive the throwing direction without fail.

In the illustrated embodiment, the color of the arrow Na is changed depending on the number of turns that the throwing body has made. However, the color of the arrow Na may be changed from a cold color to a warm color as the value of the throwing energy increases. The arrow Na thus displayed is effective to give the game player an easily recognizable visual guide as to the time at which the object is to be hurled for a greater distance.

Although a certain preferred embodiment of the present invention has been shown and described in detail, it should be understood that various changes and modifications may be made therein without departing from the scope of the appended claims.

What is claimed is:

1. A method of displaying an object-throwing guide in an object-throwing video game, comprising the steps of:

displaying at least an image of a throwing body and an image of an object to be visually hurled from said throwing body in a game space on a display screen;

controlling said image of the throwing body to visually move in preparation for visually hurling said image of the object in said game space in response to manual operation of a controller;

controlling said image of the object to be visually hurled from said image of the throwing body in said game space in response to manual operation of the controller; and displaying an image of an object-throwing guide in said game space to indicate a throwing direction in which to hurl the image of the object from the image of the throwing body and which progressively varies depending on the movement of said image of the throwing body for visually hurling said image of the object.

2. A method according to claim 1, wherein said step of controlling said image of the throwing body comprises the step of controlling said image of the throwing body to turn along an arc or rotate about a center in said game space.

3. A method according to claim 2, wherein said step of displaying the image of the object-throwing guide comprises the step of displaying the image of the object-throwing guide at successive positions on a trail depending on the movement of said image of the throwing body.

4. A method according to claim 2, wherein said step of displaying the image of the object-throwing guide comprises the step of displaying the image of the object-throwing guide along an image of a path along said arc or about said center at successive positions on a trail depending on the movement of said image of the throwing body.

5. A method according to claim 4, further comprising the step of generating said image of the path based on coordinate information of the image of the object-throwing guide which is displayed in said game space at a present time and coordinate information of the image of the object-throwing guide which was displayed in said game space at a time which precedes said present time by a predetermined period.

6. A method according to claim 1, wherein said step of displaying the image of the object-throwing guide comprises the step of three-dimensionally displaying the image of the object-throwing guide in said game space.

7. A method according to claim 1, wherein said image of the object-throwing guide comprises a substantially arrow-shaped image shaped for pointing said throwing direction.

8. A method according to claim 1, wherein said step of displaying the image of the object-throwing guide comprises the step of changing colors of said image of the object-throwing guide depending on movement of the image of the throwing body along an arc or about a center in said game space.

9. A method according to claim 8, wherein said step of changing colors of said image of the object-throwing guide comprises the step of changing said colors successively from a cold color to a warm color.

10. A method of displaying an object-throwing guide in an object-throwing video game, comprising the steps of:
  displaying at least a throwing body and an object to be virtually hurled by the throwing body in a game space on a display screen;
  controlling the displayed throwing body to move in preparation for hurling the displayed object in the game space in response to manual operation of a controller;
  controlling the displayed object to be hurled from the displayed throwing body in the game space in response to manual operation of the controller; and
  displaying an object-throwing guide in the game space to indicate a throwing direction in which the displayed object is to be hurled from the displayed throwing body and which progressively varies depending on the movement of the displayed throwing body for hurling the displayed object.

11. A method according to claim 10, wherein said step of displaying the object-throwing guide comprising the steps of:
  acquiring linear and angular displacements of the displayed object-throwing guide based on throwing angle information of the displayed object based on operation of the controller;
  acquiring address data in a memory of the displayed object-throwing guide based on coordinate information of the displayed object-throwing guide and the acquired linear and angular displacements; and
  supplying a graphic command comprising at least address data in the memory of representative points of the displayed object-throwing guide, information for indicating color information of the displayed object-throwing guide, and texture information of the displayed object-throwing guide to display the object-throwing guide.

12. A method according to claim 11, wherein said step of supplying said graphic command comprises the step of changing colors of said displayed object-throwing guide depending on movement of the displayed throwing body along an arc or about a center in said game space.

13. A method according to claim 12, wherein said step of changing colors of said displayed object-throwing guide comprises the step of changing said colors successively from a cold color to a warm color.

14. A method according to claim 10, further comprising the step of generating an image of a trail of the displayed object-throwing guide, said step of generating the image of the trail comprising the steps of:
  storing address data in a memory of the displayed object-throwing guide; and
  supplying one set of address data extracted from address data in the memory of two present and past images of the displayed object-throwing guide, information for indicating a color of the displayed object-throwing guide, and texture information of the displayed object-throwing guide to generate and display the image of the trail of the displayed object-throwing guide.

15. A method according to claim 10, wherein said step of controlling said displayed throwing body comprises the step of controlling said displayed throwing body to turn along an arc or rotate about a center in said game space.

16. A method according to claim 15, wherein said step of displaying the object-throwing guide comprises the step of displaying the object-throwing guide at successive positions on a trail depending on the movement of said displayed throwing body.

17. A method according to claim 15, wherein said step of displaying the object-throwing guide comprises the step of displaying the object-throwing guide along an image of a path along said arc or about said center at successive positions on a trail depending on the movement of said displayed throwing body.

18. A method according to claim 10, wherein said step of displaying the object-throwing guide comprises the step of three-dimensionally displaying the object-throwing guide in said game space.

19. A method according to claim 10, wherein said displayed object-throwing guide comprises a substantially arrow-shaped image shaped for pointing said throwing direction.

20. An object-throwing video game system comprising:
  display means for displaying at least an image of a throwing body and an image of an object to be visually hurled from said throwing body in a game space; and
  control means for controlling said image of the throwing body to visually move in preparation for visually hurling said image of the object in said game space in response to manual operation of a controller, and controlling said image of the object to be visually hurled from said image of the throwing body in said game space in response to manual operation of the controller;

said control means comprising means for displaying an image of an object-throwing guide in said game space to indicate a throwing direction in which to hurl the image of the object from the image of the throwing body and which progressively varies depending on the movement of said image of the throwing body for visually hurling said image of the object.

21. An object-throwing video game system according to claim 20, wherein said control means comprises means for controlling said image of the throwing body to turn along an arc or rotate about a center in said game space.

22. An object-throwing video game system according to claim 21, wherein said control means comprises means for displaying the image of the object-throwing guide at successive positions on a trail depending on the movement of said image of the throwing body.

23. An object-throwing video game system according to claim 21, wherein said control means comprises means for displaying the image of the object-throwing guide along an image of a path along said arc or about said center at successive positions on a trail depending on the movement of said image of the throwing body.

24. An object-throwing video game system according to claim 23, wherein said control means comprises means for generating said image of the path based on coordinate information of the image of the object-throwing guide which is displayed in said game space at a present time and coordinate information of the image of the object-throwing guide which was displayed in said game space at a time which precedes said present time by a predetermined period.

25. An object-throwing video game system according to claim 20, wherein said control means comprises means for three-dimensionally displaying the image of the object-throwing guide in said game space.

26. An object-throwing video game system according to claim 20, wherein said image of the object-throwing guide comprises a substantially arrow-shaped image shaped for pointing said throwing direction.

27. An object-throwing video game system according to claim 20, wherein said control means comprises means for changing colors of said image of the object-throwing guide depending on movement of the image of the throwing body along an arc or about a center in said game space.

28. An object-throwing video game system according to claim 27, wherein said control means comprises means for changing said colors successively from a cold color to a warm color.

* * * * *